US012579315B2

(12) United States Patent
Vuppalapati et al.

(10) Patent No.: US 12,579,315 B2
(45) Date of Patent: Mar. 17, 2026

(54) SYSTEMS AND METHODS FOR REMOVING SENSITIVE DATA FROM A CLOUD-BASED SYSTEM

(71) Applicant: Zscaler, Inc., San Jose, CA (US)

(72) Inventors: Raj Vuppalapati, Austin, TX (US);
Nikita Gulabani, Reading, MA (US);
Suji Suresh, Westford, MA (US)

(73) Assignee: Zscaler, Inc., San Jose, CA (US)

( * ) Notice: Subject to any disclaimer, the term of this patent is extended or adjusted under 35 U.S.C. 154(b) by 216 days.

(21) Appl. No.: 18/475,721

(22) Filed: Sep. 27, 2023

(65) Prior Publication Data

US 2025/0103752 A1     Mar. 27, 2025

(51) Int. Cl.
*G06F 21/62* (2013.01)
*H04L 67/1097* (2022.01)

(52) U.S. Cl.
CPC ...... *G06F 21/6263* (2013.01); *G06F 21/6254* (2013.01); *H04L 67/1097* (2013.01)

(58) Field of Classification Search
None
See application file for complete search history.

(56) References Cited

U.S. PATENT DOCUMENTS

| | | | |
|---|---|---|---|
| 9,021,135 B2 * | 4/2015 | Ang | H04L 63/0815 |
| | | | 725/109 |
| 9,411,948 B1 | 8/2016 | Suresh et al. | |
| 11,496,387 B2 | 11/2022 | Laplante et al. | |
| 11,632,401 B2 | 4/2023 | Smith et al. | |
| 2023/0015412 A1 * | 1/2023 | Mendoza | G06F 21/6245 |
| 2023/0325363 A1 * | 10/2023 | Valt | G06F 16/164 |
| | | | 707/829 |
| 2025/0086308 A1 * | 3/2025 | Crume | G06N 5/025 |
| 2025/0103750 A1 * | 3/2025 | Balayan | G06F 8/71 |

* cited by examiner

*Primary Examiner* — Jeffrey R Swearingen
(74) *Attorney, Agent, or Firm* — Baratta Law PLLC; Lawrence A. Baratta, Jr.; Ryan Odessa

(57)     ABSTRACT

Systems and methods for removing sensitive information from a cloud-based system include receiving one or more dictionaries, the one or more dictionaries including a plurality of field names identified as corresponding to sensitive information; analyzing one or more data storage schemas, the one or more data storage schemas defining how data is stored in a cloud-based system; comparing a plurality of variables within the one or more data storage schemas to the field names in the one or more dictionaries for identifying matches therein; and responsive to identifying a match between a variable of the plurality of variables and one or more of the field names, performing an action based thereon.

18 Claims, 12 Drawing Sheets

1200

1202
RECEIVING ONE OR MORE DICTIONARIES, THE ONE OR MORE DICTIONARIES INCLUDING A PLURALITY OF FIELD NAMES IDENTIFIED AS CORRESPONDING TO SENSITIVE INFORMATION

1204
ANALYZING ONE OR MORE DATA STORAGE SCHEMAS, THE ONE OR MORE DATA STORAGE SCHEMAS DEFINING HOW DATA IS STORED IN A CLOUD-BASED SYSTEM

1206
COMPARING A PLURALITY OF VARIABLES WITHIN THE ONE OR MORE DATA STORAGE SCHEMAS TO THE FIELD NAMES IN THE ONE OR MORE DICTIONARIES FOR IDENTIFYING MATCHES THEREIN

1208
RESPONSIVE TO IDENTIFYING A MATCH BETWEEN A VARIABLE OF THE PLURALITY OF VARIABLES AND ONE OR MORE OF THE FIELD NAMES, PERFORMING AN ACTION BASED THEREON

600

602
USER ATTEMPTS TO SEND DATA

604
EN FINDS A DLP VIOLATION AND FORWARDS THE TRANSACTION INFORMATION TO A SECOND EN TASKED WITH SENDING COMMUNICATIONS USING ICAP

606
THE SECOND EN SENDS TRANSACTION INFORMATION TO ORGANIZATIONS'S DLP SERVER USING SECURE ICAP

608

502
ORGANIZATION'S DLP SERVER

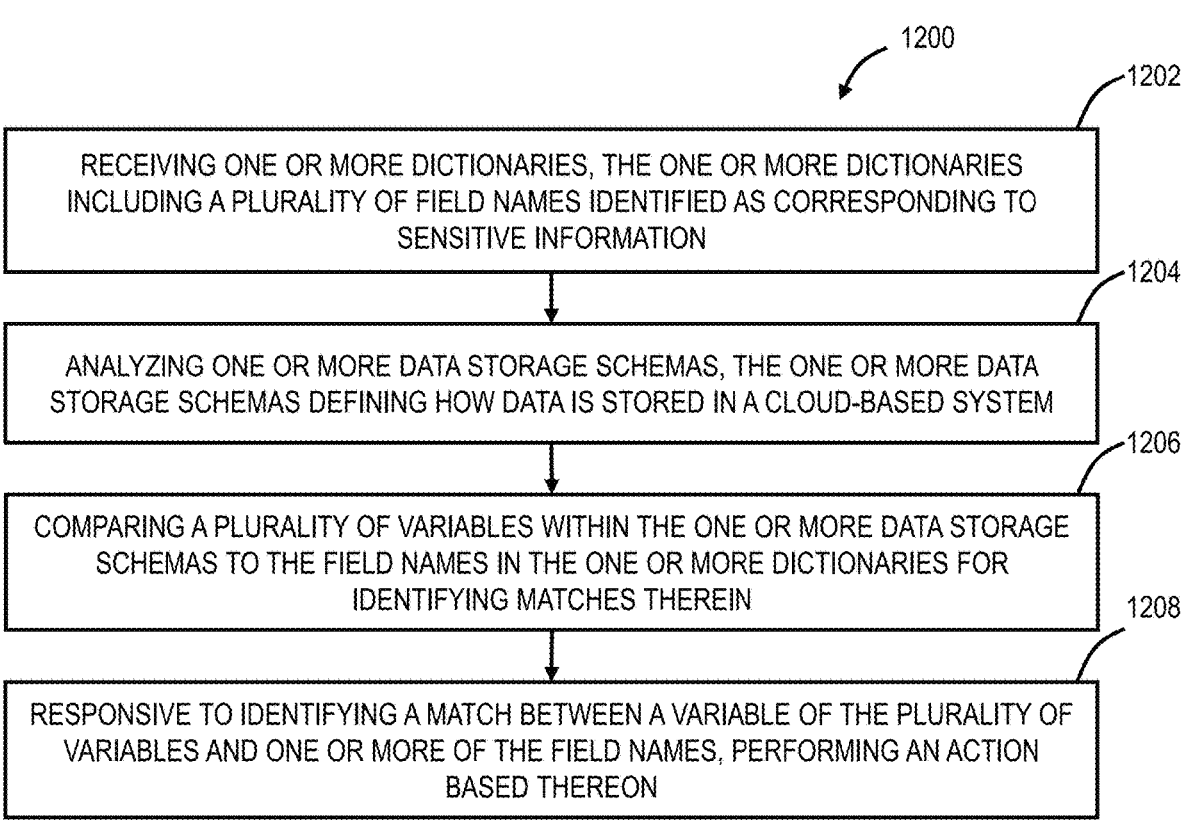

RECEIVING ONE OR MORE DICTIONARIES, THE ONE OR MORE DICTIONARIES INCLUDING A PLURALITY OF FIELD NAMES IDENTIFIED AS CORRESPONDING TO SENSITIVE INFORMATION

ANALYZING ONE OR MORE DATA STORAGE SCHEMAS, THE ONE OR MORE DATA STORAGE SCHEMAS DEFINING HOW DATA IS STORED IN A CLOUD-BASED SYSTEM

COMPARING A PLURALITY OF VARIABLES WITHIN THE ONE OR MORE DATA STORAGE SCHEMAS TO THE FIELD NAMES IN THE ONE OR MORE DICTIONARIES FOR IDENTIFYING MATCHES THEREIN

RESPONSIVE TO IDENTIFYING A MATCH BETWEEN A VARIABLE OF THE PLURALITY OF VARIABLES AND ONE OR MORE OF THE FIELD NAMES, PERFORMING AN ACTION BASED THEREON

FIG. 12

SYSTEMS AND METHODS FOR REMOVING SENSITIVE DATA FROM A CLOUD-BASED SYSTEM

FIELD OF THE DISCLOSURE

The present disclosure relates generally to networking and computing. More particularly, the present disclosure relates to systems and methods for removing sensitive data from a cloud-based system.

BACKGROUND OF THE DISCLOSURE

Data Loss Prevention (DLP) involves monitoring of an organization's sensitive data, including data at endpoint devices, data at rest, and data in motion. Conventional DLP approaches focus on a variety of products, including software agents at endpoints, physical appliances, virtual appliances, etc. In addition to providing DLP services on real-time traffic to cloud customers, it is also important to provide data protection for data that is stored within the cloud-based system. Cloud customers can have sensitive information persisted in various cloud services such as distributed event stores and stream-processing platforms. Removing sensitive data from such services becomes increasingly important when customers are offboarded from a cloud-based system. Without visibility and control, organizations are at an increased risk of data loss, due either to unintentional or malicious reasons if sensitive data is persisted.

BRIEF SUMMARY OF THE DISCLOSURE

In an embodiment, a method and a non-transitory computer-readable storage medium having computer-readable code stored thereon for programming a device are provided to perform steps. The steps include receiving one or more dictionaries, the one or more dictionaries including a plurality of field names identified as corresponding to sensitive information; analyzing one or more data storage schemas, the one or more data storage schemas defining how data is stored in a cloud-based system; comparing a plurality of variables within the one or more data storage schemas to the field names in the one or more dictionaries for identifying matches therein; and responsive to identifying a match between a variable of the plurality of variables and one or more of the field names, performing an action based thereon.

The steps can further include wherein the one or more dictionaries include customer specific field names, and wherein the action is performed on a per-customer basis. The action can include any of obfuscating data associated with the variable and removing data associated with the variable. The data can be persisted in Apache Kafka, and removing data associated with the variable can include creating a tombstone record. The steps can be performed responsive to a requirement to offboard a customer of the cloud-based system, in which case the steps include analyzing one or more Apache Kafka schemas, the one or more Apache Kafka schemas defining how data is stored and persisted in Apache Kafka; comparing a plurality of variables within the one or more Apache Kafka schemas to field names in a dictionary, wherein the field names correspond to sensitive information; and responsive to identifying a match between a variable of the plurality of variables and one or more of the field names, removing data associated with the variable from persisting in Apache Kafka. The steps can include receiving a dictionary associated with the customer being offboarded. The plurality of variables within the one or more Apache Kafka schemas define data fields, wherein removing data associated with the variable can include removing the data from associated data fields. The one or more dictionaries can include any of a predefined dictionary and a custom dictionary. The one or more dictionaries can include a model generated dictionary, the model generated dictionary being generated by one or more machine learning models trained with sensitive data. The steps can include monitoring traffic within the cloud-based system, wherein the action can include, based on the one or more storage schemas and the one or more dictionaries, causing data to not be persisted.

BRIEF DESCRIPTION OF THE DRAWINGS

The present disclosure is illustrated and described herein with reference to the various drawings, in which like reference numbers are used to denote like system components/ method steps, as appropriate, and in which:

FIG. 3 is a block diagram of a server that may be used in the cloud-based security system of FIGS. 1 and 2 or the like.

FIG. 4 is a block diagram of a user device that may be used with the cloud-based security system of FIGS. 1 and 2 or the like.

FIG. 12 is a flow chart of a process for removing sensitive data from a cloud-based system.

DETAILED DESCRIPTION OF THE DISCLOSURE

The present disclosure relates to systems and methods for removing sensitive data from a cloud-based system. Various embodiments described herein are adapted to utilize one or more dictionaries that contain known sensitive data fields/ variables. These dictionaries are compared to various data storage schemas to determine if sensitive data is being persisted. If matches are found, the systems can identify data relating to the various matching fields as being sensitive, and remedial actions can be performed based thereon. In an exemplary use case, these systems can be implemented when a customer is being offboarded from a cloud-based system, or services offered therefrom. The systems can be adapted to utilize a customizable dictionary associated with the specific customer in order to remove any sensitive data that might be persisted in the cloud-based system.

Example Cloud-Based Security System Architecture

Figure 1A:
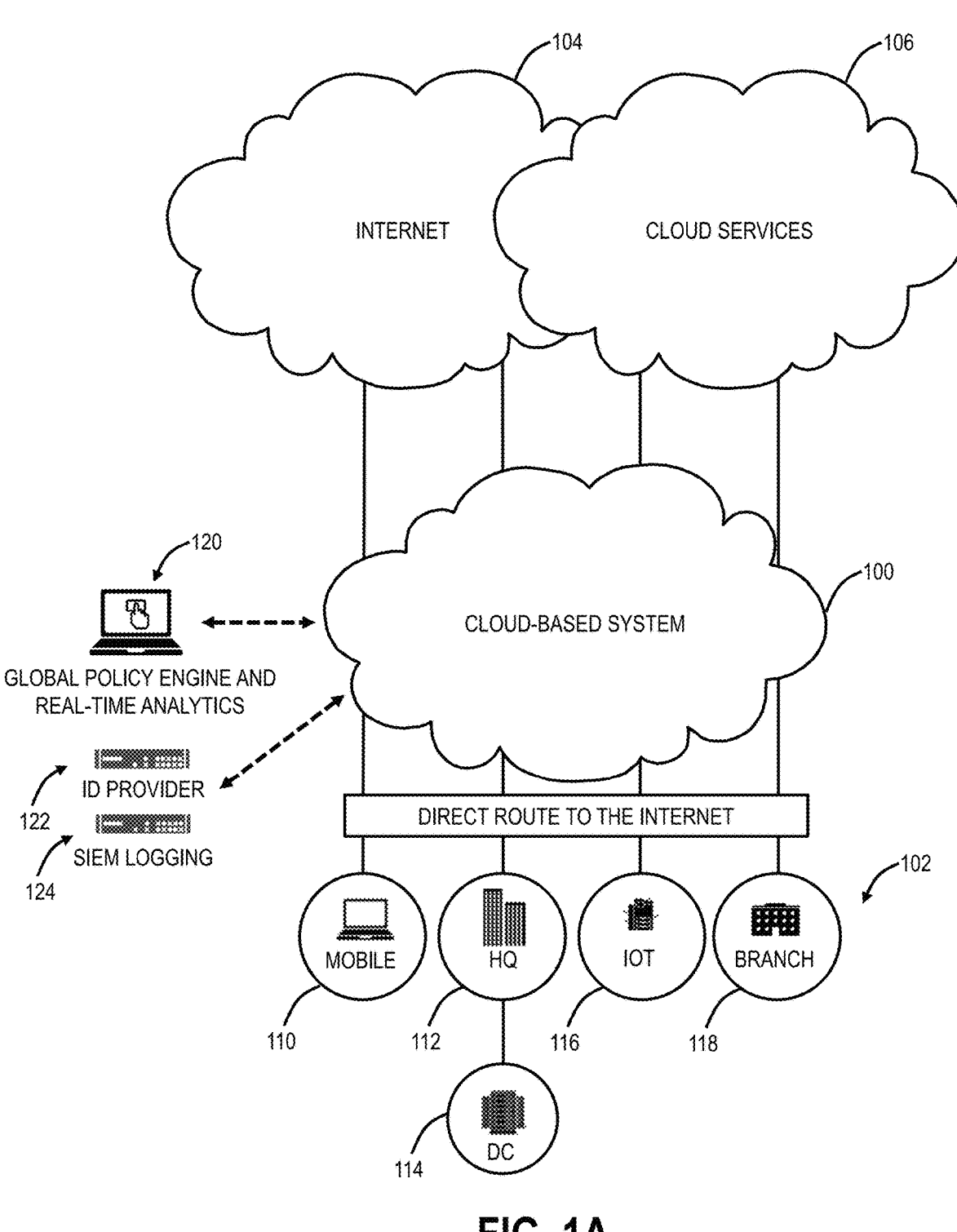
FIG. 1A is a network diagram of a cloud-based system offering security as a service.

FIG. 1A is a network diagram of a cloud-based system 100 offering security as a service. Specifically, the cloud-based system 100 can offer a Secure Internet and Web Gateway as a service to various users 102, as well as other cloud services. In this manner, the cloud-based system 100 is located between the users 102 and the Internet as well as any cloud services 106 (or applications) accessed by the users 102. As such, the cloud-based system 100 provides inline monitoring inspecting traffic between the users 102, the Internet 104, and the cloud services 106, including Secure Sockets Layer (SSL) traffic. The cloud-based system 100 can offer access control, threat prevention, data protection, etc. The access control can include a cloud-based firewall, cloud-based intrusion detection, Uniform Resource Locator (URL) filtering, bandwidth control, Domain Name System (DNS) filtering, etc. The threat prevention can include cloud-based intrusion prevention, protection against advanced threats (malware, spam, Cross-Site Scripting (XSS), phishing, etc.), cloud-based sandbox, antivirus, DNS security, etc. The data protection can include Data Loss Prevention (DLP), cloud application security such as via a Cloud Access Security Broker (CASB), file type control, etc.

The cloud-based firewall can provide Deep Packet Inspection (DPI) and access controls across various ports and protocols as well as being application and user aware. The URL filtering can block, allow, or limit website access based on policy for a user, group of users, or entire organization, including specific destinations or categories of URLs (e.g., gambling, social media, etc.). The bandwidth control can enforce bandwidth policies and prioritize critical applications such as relative to recreational traffic. DNS filtering can control and block DNS requests against known and malicious destinations.

The cloud-based intrusion prevention and advanced threat protection can deliver full threat protection against malicious content such as browser exploits, scripts, identified botnets and malware callbacks, etc. The cloud-based sandbox can block zero-day exploits (just identified) by analyzing unknown files for malicious behavior. Advantageously, the cloud-based system 100 is multi-tenant and can service a large volume of the users 102. As such, newly discovered threats can be promulgated throughout the cloud-based system 100 for all tenants practically instantaneously. The antivirus protection can include antivirus, antispyware, anti-malware, etc. protection for the users 102, using signatures sourced and constantly updated. The DNS security can identify and route command-and-control connections to threat detection engines for full content inspection.

The DLP can use standard and/or custom dictionaries to continuously monitor the users 102, including compressed and/or SSL-encrypted traffic. Again, being in a cloud implementation, the cloud-based system 100 can scale this monitoring with near-zero latency on the users 102. The cloud application security can include CASB functionality to discover and control user access to known and unknown cloud services 106. The file type controls enable true file type control by the user, location, destination, etc. to determine which files are allowed or not.

Figure 5:
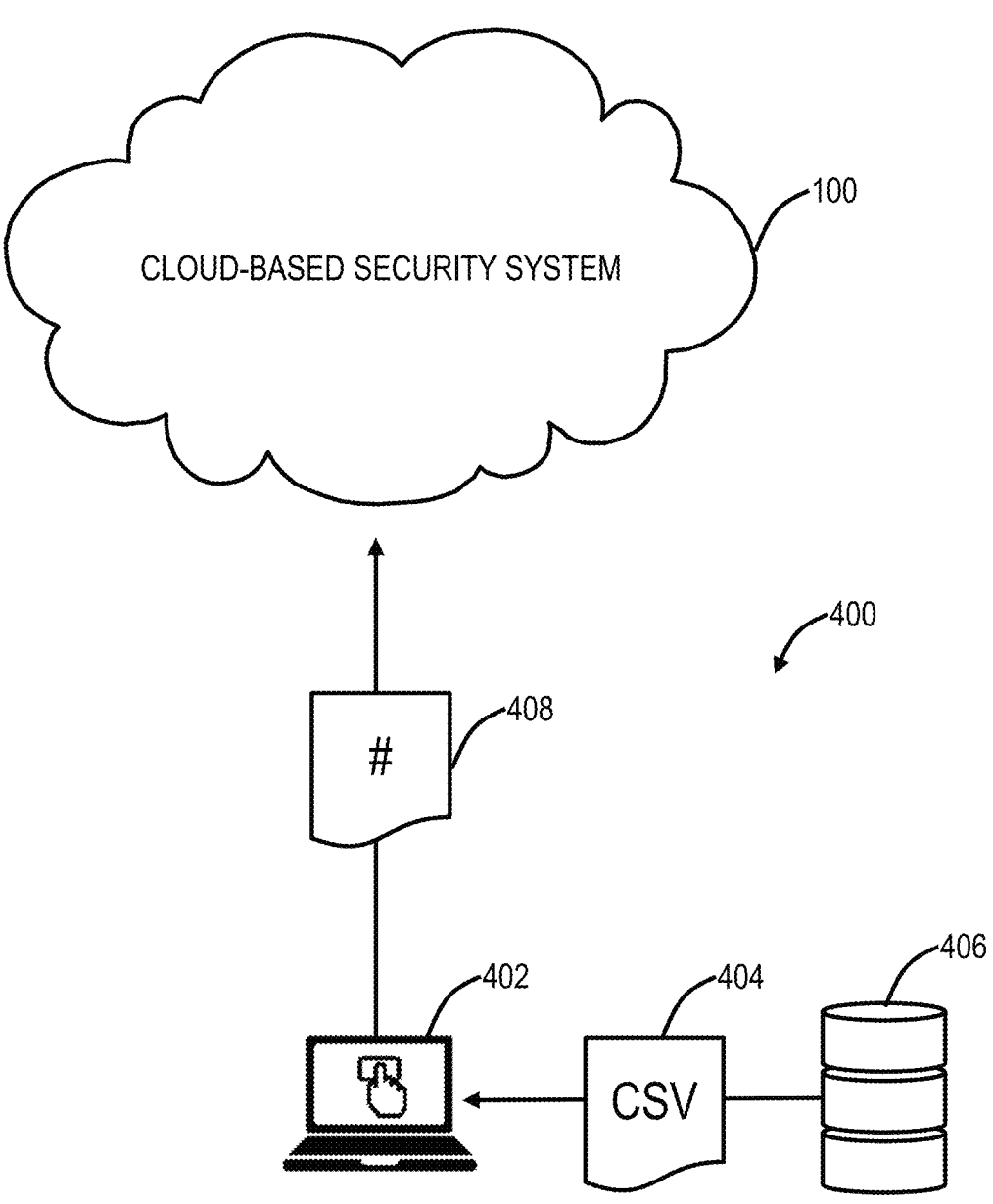
FIG. 5 is a network diagram of an Exact Data Match (EDM) system for use with the cloud-based security system.

For illustration purposes, the users 102 of the cloud-based system 100 can include a mobile device 110, a headquarters (HQ) 112 which can include or connect to a data center (DC) 114, Internet of Things (IoT) devices 116, a branch office/remote location 118, etc., and each includes one or more user devices (an example user device 300 is illustrated in FIG. 5). The devices 110, 116, and the locations 112, 114, 118 are shown for illustrative purposes, and those skilled in the art will recognize there are various access scenarios and other users 102 for the cloud-based system 100, all of which are contemplated herein. The users 102 can be associated with a tenant, which may include an enterprise, a corporation, an organization, etc. That is, a tenant is a group of users who share a common access with specific privileges to the cloud-based system 100, a cloud service, etc. In an embodiment, the headquarters 112 can include an enterprise's network with resources in the data center 114. The mobile device 110 can be a so-called road warrior, i.e., users that are off-site, on-the-road, etc. Those skilled in the art will recognize a user 102 has to use a corresponding user device 300 for accessing the cloud-based system 100 and the like, and the description herein may use the user 102 and/or the user device 300 interchangeably.

Further, the cloud-based system 100 can be multi-tenant, with each tenant having its own users 102 and configuration, policy, rules, etc. One advantage of the multi-tenancy and a large volume of users is the zero-day/zero-hour protection in that a new vulnerability can be detected and then instantly remediated across the entire cloud-based system 100. The same applies to policy, rule, configuration, etc. changes—they are instantly remediated across the entire cloud-based system 100. As well, new features in the cloud-based system 100 can also be rolled up simultaneously across the user base, as opposed to selective and time-consuming upgrades on every device at the locations 112, 114, 118, and the devices 110, 116.

Logically, the cloud-based system 100 can be viewed as an overlay network between users (at the locations 112, 114, 118, and the devices 110, 116) and the Internet 104 and the cloud services 106. Previously, the IT deployment model included enterprise resources and applications stored within the data center 114 (i.e., physical devices) behind a firewall (perimeter), accessible by employees, partners, contractors, etc. on-site or remote via Virtual Private Networks (VPNs), etc. The cloud-based system 100 is replacing the conventional deployment model. The cloud-based system 100 can be used to implement these services in the cloud without requiring the physical devices and management thereof by enterprise IT administrators. As an ever-present overlay network, the cloud-based system 100 can provide the same functions as the physical devices and/or appliances regardless of geography or location of the users 102, as well as independent of platform, operating system, network access technique, network access provider, etc.

There are various techniques to forward traffic between the users 102 at the locations 112, 114, 118, and via the devices 110, 116, and the cloud-based system 100. Typically, the locations 112, 114, 118 can use tunneling where all traffic is forward through the cloud-based system 100. For example, various tunneling protocols are contemplated, such as Generic Routing Encapsulation (GRE), Layer Two Tunneling Protocol (L2TP), Internet Protocol (IP) Security (IPsec), customized tunneling protocols, etc. The devices 110, 116, when not at one of the locations 112, 114, 118 can use a local application that forwards traffic, a proxy such as via a Proxy Auto-Config (PAC) file, and the like. An application of the local application is the application 350 described in detail herein as a connector application. A key aspect of the cloud-based system 100 is all traffic between the users 102 and the Internet 104 or the cloud services 106 is via the cloud-based system 100. As such, the cloud-based system 100 has visibility to enable various functions, all of which are performed off the user device in the cloud.

The cloud-based system 100 can also include a management system 120 for tenant access to provide global policy and configuration as well as real-time analytics. This enables IT administrators to have a unified view of user activity, threat intelligence, application usage, etc. For example, IT administrators can drill-down to a per-user level to understand events and correlate threats, to identify compromised devices, to have application visibility, and the like. The cloud-based system 100 can further include connectivity to an Identity Provider (IDP) 122 for authentication of the users 102 and to a Security Information and Event Management (SIEM) system 124 for event logging. The system 124 can provide alert and activity logs on a per-user 102 basis.

Zero Trust

Figure 1B:
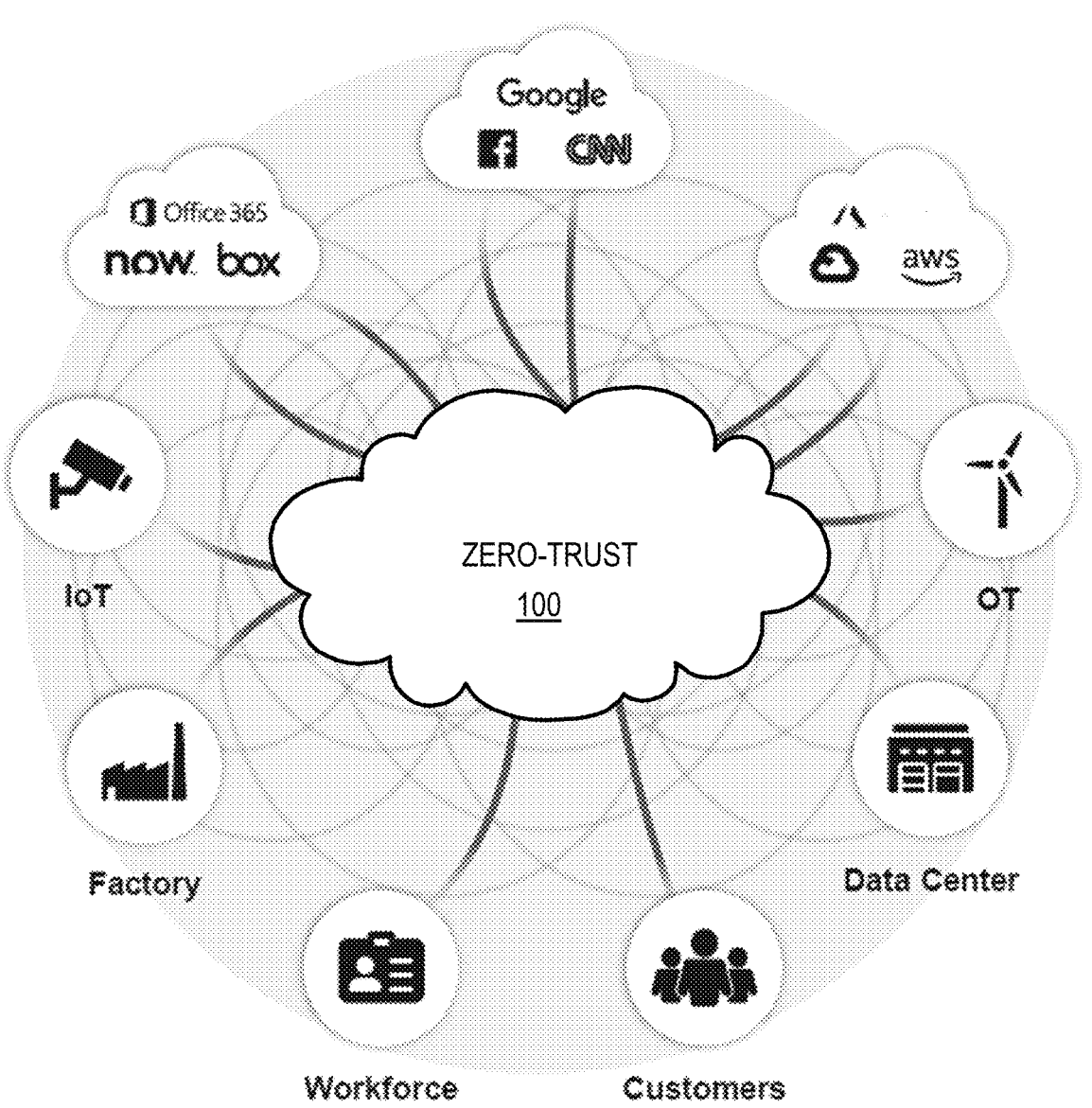
FIG. 1B is a logical diagram of the cloud-based system operating as a zero-trust platform.

FIG. 1B is a logical diagram of the cloud-based system 100 operating as a zero-trust platform. Zero trust is a framework for securing organizations in the cloud and mobile world that asserts that no user or application should be trusted by default. Following a key zero trust principle, least-privileged access, trust is established based on context (e.g., user identity and location, the security posture of the endpoint, the app or service being requested) with policy checks at each step, via the cloud-based system 100. Zero trust is a cybersecurity strategy wherein security policy is applied based on context established through least-privileged access controls and strict user authentication—not assumed trust. A well-tuned zero trust architecture leads to simpler network infrastructure, a better user experience, and improved cyberthreat defense.

Establishing a zero trust architecture requires visibility and control over the environment's users and traffic, including that which is encrypted; monitoring and verification of traffic between parts of the environment; and strong multi-factor authentication (MFA) methods beyond passwords, such as biometrics or one-time codes. This is performed via the cloud-based system 100. Critically, in a zero trust architecture, a resource's network location is not the biggest factor in its security posture anymore. Instead of rigid network segmentation, your data, workflows, services, and such are protected by software-defined microsegmentation, enabling you to keep them secure anywhere, whether in your data center or in distributed hybrid and multicloud environments.

The core concept of zero trust is simple: assume everything is hostile by default. It is a major departure from the network security model built on the centralized data center and secure network perimeter. These network architectures rely on approved IP addresses, ports, and protocols to establish access controls and validate what's trusted inside the network, generally including anybody connecting via remote access VPN. In contrast, a zero trust approach treats all traffic, even if it is already inside the perimeter, as hostile. For example, workloads are blocked from communicating until they are validated by a set of attributes, such as a fingerprint or identity. Identity-based validation policies result in stronger security that travels with the workload wherever it communicates—in a public cloud, a hybrid environment, a container, or an on-premises network architecture.

Because protection is environment-agnostic, zero trust secures applications and services even if they communicate across network environments, requiring no architectural changes or policy updates. Zero trust securely connects users, devices, and applications using business policies over any network, enabling safe digital transformation. Zero trust is about more than user identity, segmentation, and secure access. It is a strategy upon which to build a cybersecurity ecosystem.

At its core are three tenets:

Terminate every connection: Technologies like firewalls use a "passthrough" approach, inspecting files as they are delivered. If a malicious file is detected, alerts are often too late. An effective zero trust solution terminates every connection to allow an inline proxy architecture to inspect all traffic, including encrypted traffic, in real time—before it reaches its destination—to prevent ransomware, malware, and more.

Protect data using granular context-based policies: Zero trust policies verify access requests and rights based on context, including user identity, device, location, type of content, and the application being requested. Policies are adaptive, so user access privileges are continually reassessed as context changes.

Reduce risk by eliminating the attack surface: With a zero trust approach, users connect directly to the apps and resources they need, never to networks (see ZTNA). Direct user-to-app and app-to-app connections eliminate the risk of lateral movement and prevent compromised devices from infecting other resources. Plus, users and apps are invisible to the internet, so they cannot be discovered or attacked.

Figure 1C:
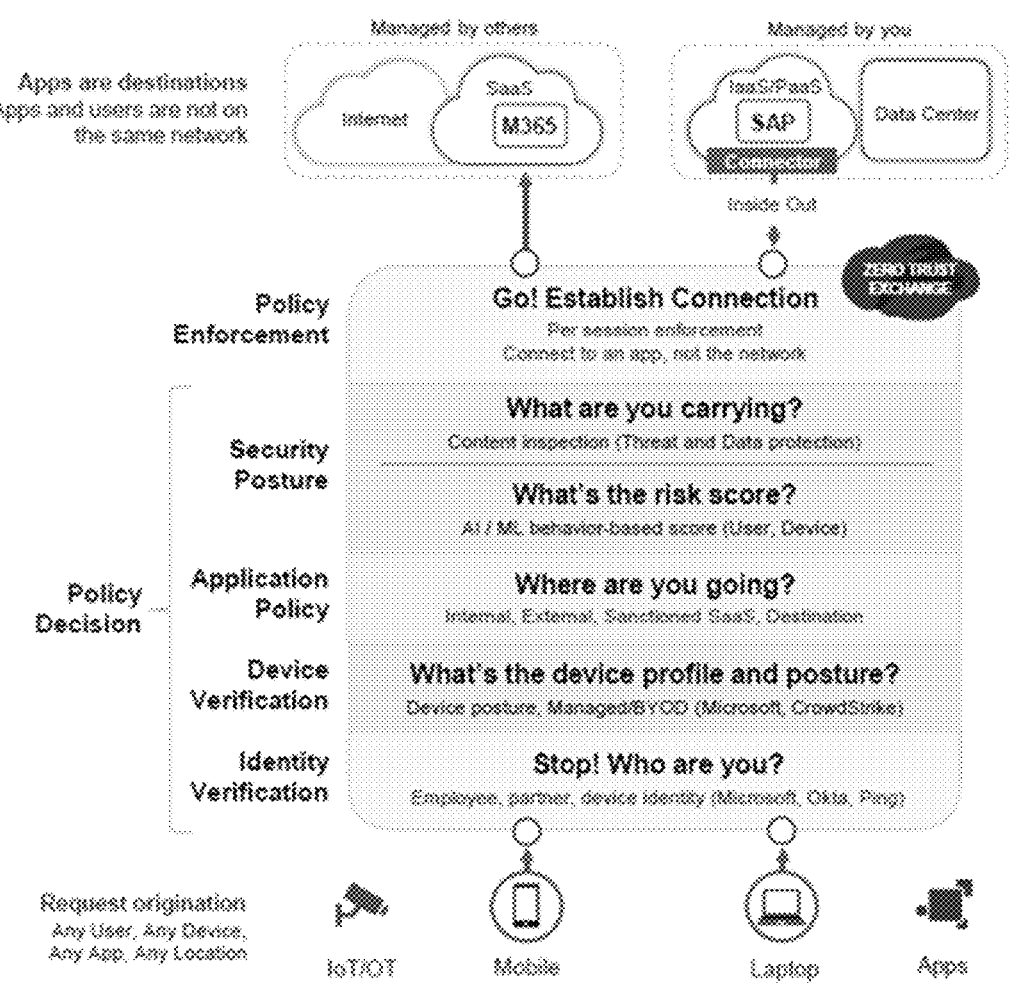
FIG. 1C is a logical diagram illustrating zero trust policies with the cloud-based system and a comparison with the conventional firewall-based approach.
Figure 1C:
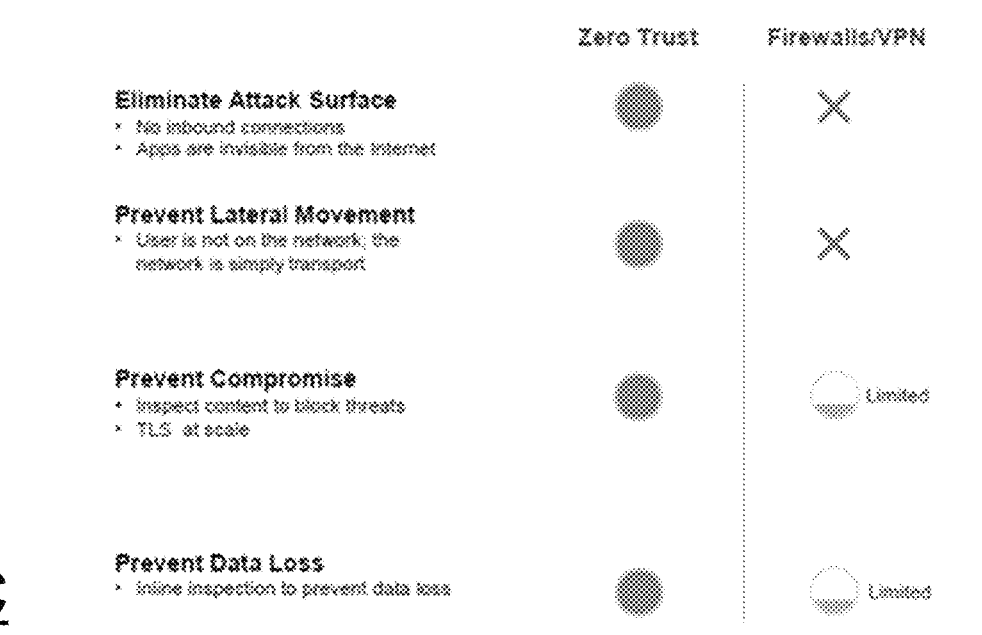

FIG. 1C is a logical diagram illustrating zero trust policies with the cloud-based system 100 and a comparison with the conventional firewall-based approach. Zero trust with the cloud-based system 100 allows per session policy decisions and enforcement regardless of the user 102 location. Unlike the conventional firewall-based approach, this eliminates attack surfaces, there are no inbound connections; prevents lateral movement, the user is not on the network; prevents compromise, allowing encrypted inspection; and prevents data loss with inline inspection.

Example Implementation of the Cloud-Based System

Figure 2:
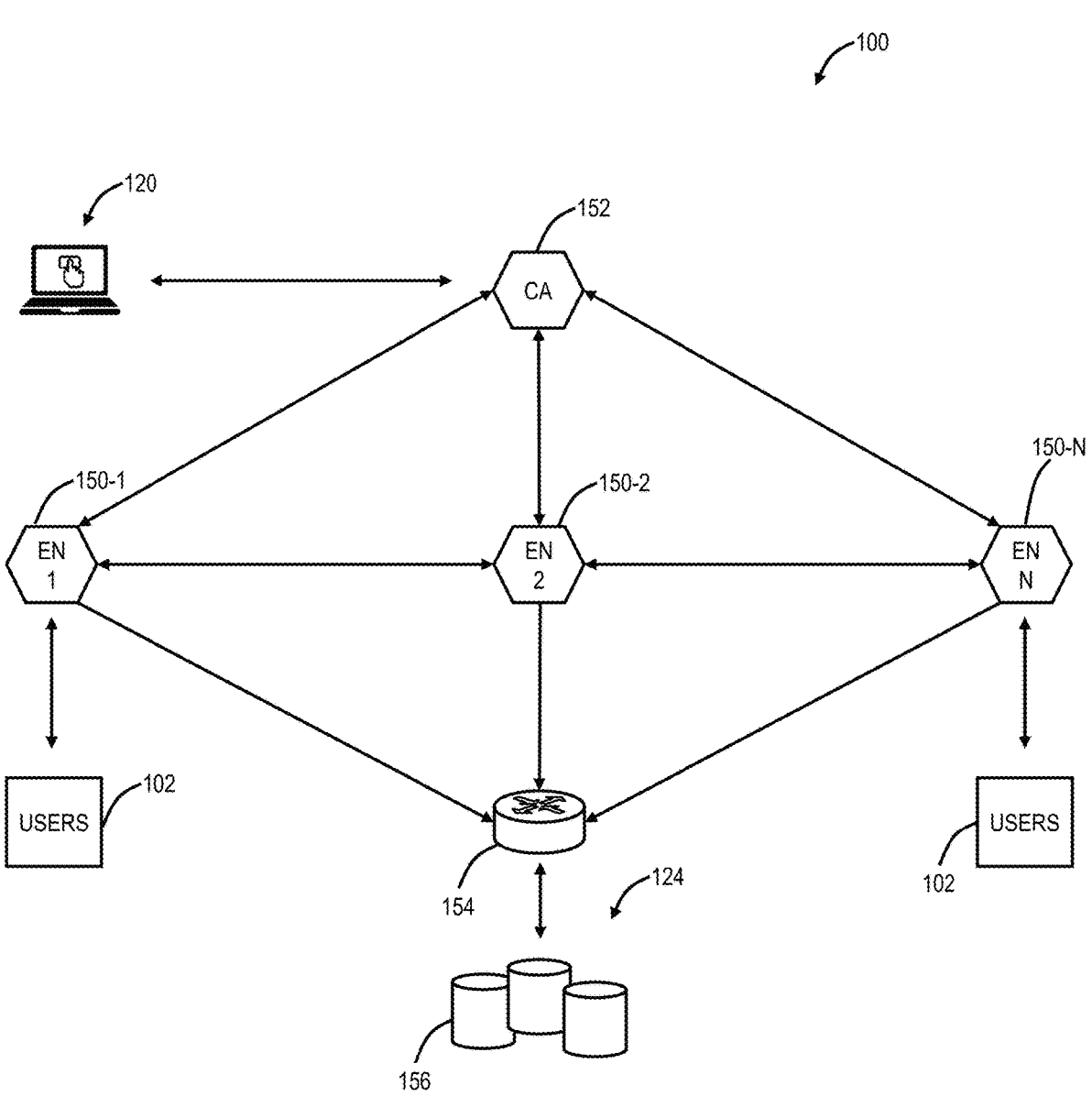
FIG. 2 is a network diagram of an example implementation of the cloud-based security system.
Figure 4:
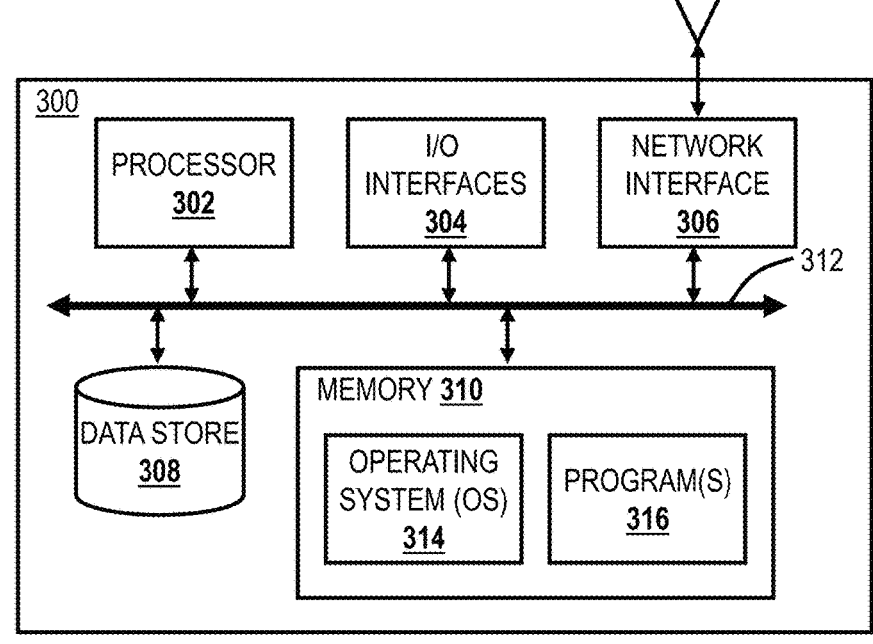

FIG. 2 is a network diagram of an example implementation of the cloud-based system 100. In an embodiment, the cloud-based system 100 includes a plurality of nodes 150, labeled as nodes 150-1, 150-2, 150-N, interconnected to one another and interconnected to a central authority (CA) 152. The nodes 150 and the central authority 152, while described as nodes, can include one or more servers, including physical servers, virtual machines (VM) executed on physical hardware, etc. An example of a server is illustrated in FIG. 4. The cloud-based system 100 further includes a log router 154 that connects to a storage cluster 156 for supporting log maintenance from the nodes 150. The central authority 152 provide centralized policy, real-time threat updates, etc. and coordinates the distribution of this data between the nodes 150. The nodes 150 provide an onramp to the users 102 and are configured to execute policy, based on the central authority 152, for each user 102. The nodes 150 can be geographically distributed, and the policy for each user 102 follows that user 102 as he or she connects to the nearest (or other criteria) node 150.

Of note, the cloud-based system 100 is an external system meaning it is separate from tenant's private networks (enterprise networks) as well as from networks associated with the devices 110, 116, and locations 112, 118. Also, of note, the present disclosure describes a private node 150P that is both part of the cloud-based system 100 and part of a private network. Further, the term nodes as used herein with respect to the cloud-based system 100 can be one or more servers, including physical servers, virtual machines (VM) executed on physical hardware, appliances, custom hardware, compute resources, clusters, etc., as described above, i.e., the nodes 150 contemplate any physical implementation of computer resources. In some embodiments, the nodes 150 can be Secure Web Gateways (SWGs), proxies, Secure Access Service Edge (SASE), etc.

The nodes 150 are full-featured secure internet gateways that provide integrated internet security. They inspect all web traffic bi-directionally for malware and enforce security, compliance, and firewall policies, as described herein, as well as various additional functionality. In an embodiment, each node 150 has two main modules for inspecting traffic and applying policies: a web module and a firewall module. The nodes 150 are deployed around the world and can handle hundreds of thousands of concurrent users with millions of concurrent sessions. Because of this, regardless of where the users 102 are, they can access the Internet 104 from any device, and the nodes 150 protect the traffic and apply corporate policies. The nodes 150 can implement various inspection engines therein, and optionally, send sandboxing to another system. The nodes 150 include significant fault tolerance capabilities, such as deployment in active-active mode to ensure availability and redundancy as well as continuous monitoring.

In an embodiment, customer traffic is not passed to any other component within the cloud-based system 100, and the nodes 150 can be configured never to store any data to disk. Packet data is held in memory for inspection and then, based on policy, is either forwarded or dropped. Log data generated for every transaction is compressed, tokenized, and exported over secure Transport Layer Security (TLS) connections to the log routers 154 that direct the logs to the storage cluster 156, hosted in the appropriate geographical region, for each organization. In an embodiment, all data destined for or received from the Internet is processed through one of the nodes 150. In another embodiment, specific data specified by each tenant, e.g., only email, only executable files, etc., is processed through one of the nodes 150.

Each of the nodes 150 may generate a decision vector $D=[d1, d2, . . . , dn]$ for a content item of one or more parts $C=[c1, c2, . . . , cm]$. Each decision vector may identify a threat classification, e.g., clean, spyware, malware, undesirable content, innocuous, spam email, unknown, etc. For example, the output of each element of the decision vector D may be based on the output of one or more data inspection engines. In an embodiment, the threat classification may be reduced to a subset of categories, e.g., violating, non-violating, neutral, unknown. Based on the subset classification, the node 150 may allow the distribution of the content item, preclude distribution of the content item, allow distribution of the content item after a cleaning process, or perform threat detection on the content item. In an embodiment, the actions taken by one of the nodes 150 may be determinative on the threat classification of the content item and on a security policy of the tenant to which the content item is being sent from or from which the content item is being requested by. A content item is violating if, for any part $C=[c1, c2, . . . , cm]$ of the content item, at any of the nodes 150, any one of the data inspection engines generates an output that results in a classification of "violating."

The central authority 152 hosts all customer (tenant) policy and configuration settings. It monitors the cloud and provides a central location for software and database updates and threat intelligence. Given the multi-tenant architecture, the central authority 152 is redundant and backed up in multiple different data centers. The nodes 150 establish persistent connections to the central authority 152 to download all policy configurations. When a new user connects to an node 150, a policy request is sent to the central authority 152 through this connection. The central authority 152 then calculates the policies that apply to that user 102 and sends the policy to the node 150 as a highly compressed bitmap.

The policy can be tenant-specific and can include access privileges for users, websites and/or content that is disallowed, restricted domains, DLP dictionaries, etc. Once downloaded, a tenant's policy is cached until a policy change is made in the management system 120. The policy can be tenant-specific and can include access privileges for users, websites and/or content that is disallowed, restricted domains, DLP dictionaries, etc. When this happens, all of the cached policies are purged, and the nodes 150 request the new policy when the user 102 next makes a request. In an embodiment, the node 150 exchange "heartbeats" periodically, so all nodes 150 are informed when there is a policy change. Any node 150 can then pull the change in policy when it sees a new request.

The cloud-based system 100 can be a private cloud, a public cloud, a combination of a private cloud and a public cloud (hybrid cloud), or the like. Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "Software as a Service" (SaaS) is sometimes used to describe application programs offered through cloud computing. A common shorthand for a provided cloud computing service (or even an aggregation of all existing cloud services) is "the cloud." The cloud-based system 100 is illustrated herein as an example embodiment of a cloud-based system, and other implementations are also contemplated.

As described herein, the terms cloud services and cloud applications may be used interchangeably. The cloud service 106 is any service made available to users on-demand via the Internet, as opposed to being provided from a company's on-premises servers. A cloud application, or cloud app, is a software program where cloud-based and local components work together. The cloud-based system 100 can be utilized to provide example cloud services, including Zscaler Internet Access (ZIA), Zscaler Private Access (ZPA), and Zscaler Digital Experience (ZDX), all from Zscaler, Inc. (the assignee and applicant of the present application). Also, there can be multiple different cloud-based systems 100, including ones with different architectures and multiple cloud services. The ZIA service can provide the access control, threat prevention, and data protection described above with reference to the cloud-based system 100. ZPA can include access control, microservice segmentation, etc. The ZDX service can provide monitoring of user experience, e.g., Quality of Experience (QoE), Quality of Service (QOS), etc., in a manner that can gain insights based on continuous, inline monitoring. For example, the ZIA service can provide a user with Internet Access, and the ZPA service can provide a user with access to enterprise resources instead of traditional Virtual Private Networks (VPNs), namely ZPA provides Zero Trust Network Access (ZTNA). Those of ordinary skill in the art will recognize various other types of cloud services 106 are also contemplated. Also, other types of cloud architectures are also contemplated, with the cloud-based system 100 presented for illustration purposes.

Example Server Architecture

Figure 3:
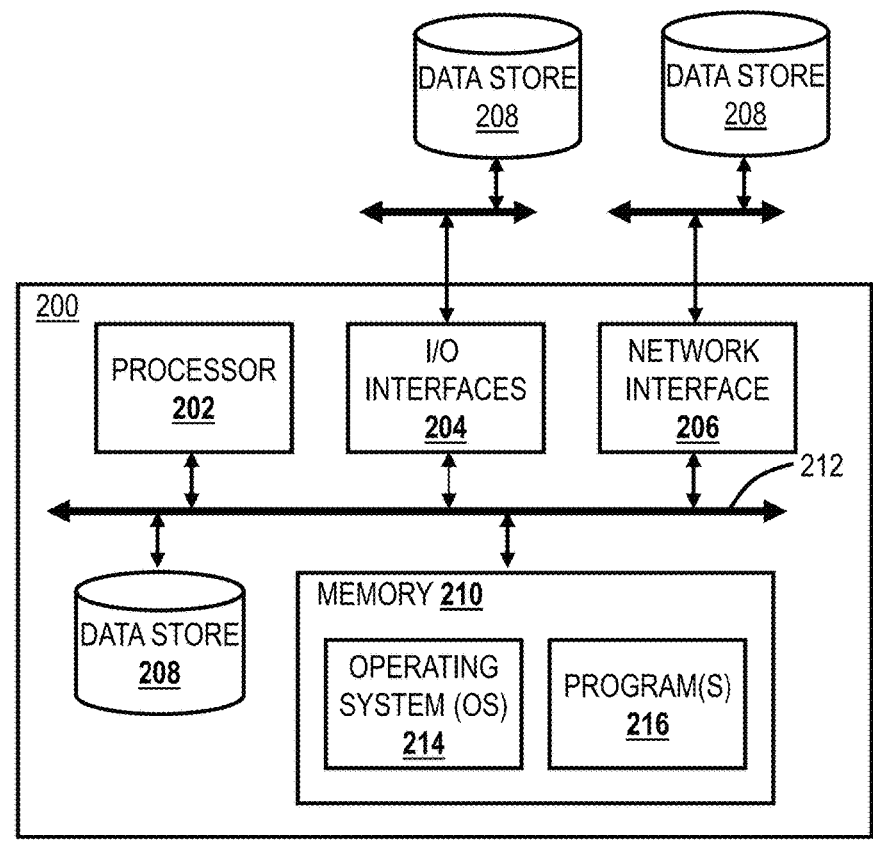

FIG. 3 is a block diagram of a server 200, which may be used in the cloud-based system 100, in other systems, or standalone. For example, the nodes 150 and the central authority 152 may be formed as one or more of the servers 200. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 3 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a Central Processing Unit (CPU), an auxiliary processor among several processors associated with the server 200, a semiconductor-based microprocessor (in the form of a microchip or chipset), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components.

The network interface 206 may be used to enable the server 200 to communicate on a network, such as the Internet 104. The network interface 206 may include, for example, an Ethernet card or adapter or a Wireless Local Area Network (WLAN) card or adapter. The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 200, such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable Operating System (O/S) 214 and one or more programs 216. The operating system 214 essentially controls the execution of other computer programs, such as the programs 216, and provides scheduling, input-output control, file and data management, memory management, and communication control and related services. The one or more programs 216 may be configured to implement the various processes, algorithms, methods, techniques, etc. described herein.

Example User Device Architecture

FIG. 4 is a block diagram of a user device 300, which may be used with the cloud-based system 100 or the like. Specifically, the user device 300 can form a device used by one of the users 102, and this may include common devices such as laptops, smartphones, tablets, netbooks, personal digital assistants, MP3 players, cell phones, e-book readers, IoT devices, servers, desktops, printers, televisions, streaming media devices, and the like. The user device 300 can be a digital device that, in terms of hardware architecture, generally includes a processor 302, I/O interfaces 304, a network interface 306, a data store 308, and memory 310. It should be appreciated by those of ordinary skill in the art that FIG. 4 depicts the user device 300 in an oversimplified manner, and a practical embodiment may include additional components and suitably configured processing logic to support known or conventional operating features that are not described in detail herein. The components (302, 304, 306, 308, and 302) are communicatively coupled via a local interface 312. The local interface 312 can be, for example, but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a CPU, an auxiliary processor among several processors associated with the user device 300, a semiconductor-based microprocessor (in the form of a microchip or chipset), or generally any device for executing software instructions. When the user device 300 is in operation, the processor 302 is configured to execute software stored within the memory 310, to communicate data to and from the memory 310, and to generally control operations of the user device 300 pursuant to the software instructions. In an embodiment, the processor 302 may include a mobile optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, a barcode scanner, and the like. System output can be provided via a display device such as a Liquid Crystal Display (LCD), touch screen, and the like.

The network interface 306 enables wireless communication to an external access device or network. Any number of suitable wireless data communication protocols, techniques, or methodologies can be supported by the network interface 306, including any protocols for wireless communication. The data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

The memory 310 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 can include one or more software programs, each of which includes an ordered listing of executable instructions for implementing logical functions. In the example of FIG. 3, the software in the memory 310 includes a suitable operating system 314 and programs 316. The operating system 314 essentially controls the execution of other computer programs and provides scheduling, input-output control, file and data management, memory management, and communication control and related services. The programs 316 may include various applications, add-ons, etc. configured to provide end-user functionality with the user device 300. For example, example programs 316 may include, but not limited to, a web browser, social networking applications, streaming media applications, games, mapping and location applications, electronic mail applications, financial applications, and the like. In a typical example, the end-user typically uses one or more of the programs 316 along with a network such as the cloud-based security system 100.

Data Loss Prevention

Data Loss Prevention (DLP) includes detection of potential data breaches/data ex-filtration transmissions and prevention by monitoring, detecting, and blocking sensitive data while in use (endpoint actions), in-motion (network traffic), and at rest (data storage). Note, the terms "data loss" and "data leak" may be used interchangeably. In various embodiments, the cloud-based security system 100 is configured to perform DLP functionality for a tenant. Data At Rest (DAR) includes the ability to scan file shares, SharePoint, or other cloud services providing file storage, and the like. Data in Motion (DIM) includes the ability to monitor data leaving the organization via multiple protocols, including SSL traffic. The multiple protocols can include, without limitation, Simple Mail Transport Protocol (SMTP), Instant Messaging (IM), File Transport Protocol (FTP), FTP Secure (FTPs), Hypertext Transfer Protocol (HTTP), HTTP Secure (HTTPS), and the like. The Data at Endpoint (DAE) monitors via an agent to monitor the data store 308 at the user devices 300.

The cloud-based security system 100 can provide DLP functionality to inspect all traffic, including encrypted traffic, no matter where, how, when, etc. the user 102 connects. This provides identical protection whether the user 102 is located on or off-network. The cloud-based security system 100 provides the same level of security to all the users 102 by moving security to the cloud, located between the users 102 and the Internet 104 and the cloud services 106. Cloud DLP policy follows users 102 where they work—on- or off-network—and provides the same level of protection to all users 102 at all times.

The cloud-based security system 100 provides full SSL inspection of all traffic. Of note, most traffic is encrypted, and no subject to inspection by traditional DLP approaches. The cloud-based security system 100 is a proxy by design system, with the nodes 150 in between and performing SSL inspection on all traffic, without the inspection limitations of appliances. Further, the cloud-based security system 100 is architected inline so it can block sensitive information before it leaves the tenant's network, instead of focusing on damage control after a compromise. The cloud-based security system 100 is user-based, not capacity-based, allowing cloud-based DLP scale elastically. The cloud-based security system 100 is configured to offer DLP as a service, eliminating redundancies of managing various appliances, reducing the resources needed to stand up and maintain point products.

The DLP functionality via the cloud-based security system 100 can include content matching, Exact Data Match (EDM), granular policies, and flexible remediation. The content matching can utilize preconfigured and/or custom DLP dictionaries supporting Regular Expressions (Regex), keywords, etc. Content detection can include numeric detection, trained dictionaries/fuzzy search, and Boolean logic. The numeric detection can detect Social Security Numbers (SSNs), medical numbers (CCNs, insurance numbers, etc.), pattern matching, etc. The trained dictionaries/fuzzy search can match financial data, source code, medical data, names, adult content, CRM data, gambling, weapons, etc. The Boolean logic can combine context and detection with logical operators, keywords, and phrases. The DLP functionality can also support context detection based on people (users, groups, departments, etc.), location (country, branch office, etc.), and reporting.

FIG. 5 is a network diagram of an EDM system 400 for use with the cloud-based security system 100. The EDM system 400 provides the ability to fingerprint sensitive data without transferring it to the cloud. The EDM system 400 includes an index tool 402 that is configured to receive data 404 from a database 406, such as a Comma Separated Value (CSV) file. The index tool 402 can be located on-site with a tenant, to avoid the need to send sensitive data to the cloud-based security system 100. To support such a configuration, the index tool 402 hashes values from the data 404, and only hash data 408 is sent to the cloud-based security system 100, not plain text. IT administrators can implement multi-criteria policies to target specific users, groups of users, locations, destinations, file types, etc. The flexible remediation can include blocking content as well as monitoring, alerting, etc.

The DLP functionality via the cloud-based security system 100 can provide real-time visibility, contextual reporting, and auditor workflow, secure Internet Content Adaptation Protocol (ICAP) forwarding, and SIEM integration. The real-time visibility provides IT administrators with instant visibility of violations as they occur for remediation and compliance. The contextual reporting and auditor workflow can provide notifications with DLP incidents. The secure ICAP forwarding supports integration with third-party DLP solutions. The SIEM integration can stream real-time logs to the system 124.

DLP Service

Figure 6:
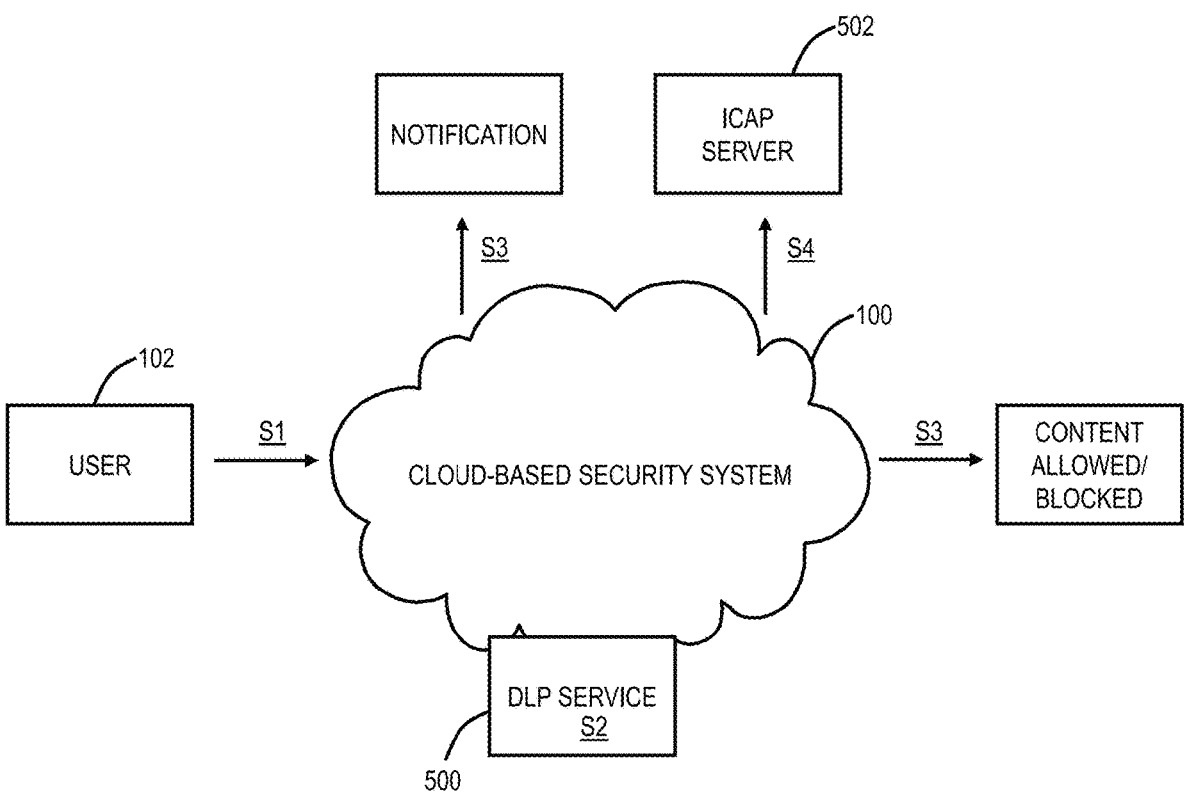
FIG. 6 is a block diagram of a DLP service implemented via the cloud-based security system.

FIG. 6 is a block diagram of a DLP service 500 implemented via the cloud-based security system 100. Here, a user 102 attempts to send content (step S1). The content is filtered by the DLP service 500 in the cloud-based security system 100 (step S2). Based on the filtering, the content is either allowed or blocked (step S3). If there is a DLP rule triggered, there can be a notification or alert (step S4) and data provided to an ICAP server 502 (step S5). The filtering is performed by one or more DLP engines looking for specific criteria, e.g., size, location, keywords, etc. The notification can be an alert or equivalent to an auditor, IT administrator, etc. The DLP service 6500 can send data to the ICAP server 502, including the client IP address and username of the user 102 (via ICAP X-headers). The present disclosure also includes a copy of the HTTP POST request that contains the relevant file or content (if the content is from HTTP Form data or a text file). The host URL that the user was sending content can also be included here.

The DLP dictionaries include a set of data that are designed to detect specific kinds of information in the user traffic. Predefined dictionaries can include bank routing numbers, adult content, credit cards, financial statement, gambling, illegal drips, medical information, names, Salesforce data, SSN, source code, etc. In addition to the predefined dictionaries, tenants can provide custom dictionaries, such as via the EDM system 400. A custom DLP dictionary can include alphanumeric patterns that match a wide variety of data types. For example, one can define patterns to detect data like phone numbers, driver's license numbers, or credit card numbers for specific issuers. In addition to the predefined dictionaries and custom dictionaries, the present systems and methods are adapted to utilize model generated dictionaries. These model generated dictionaries can be constructed by one or more machine learning models that are trained with large amounts of sensitive data in order to allow the one or more machine learning models to detect sensitive data and data types in enterprise storage for performing the DLP processes thereon.

A DLP engine is a collection of one or more DLP dictionaries. When one defines DLP policy rules, one must reference DLP engines, rather than DLP dictionaries. By using a DLP engine, one can create rules to detect content that encompasses more than one dictionary. For example, if an organization wants to protect social security and credit card numbers, one would create a rule using the PCI Engine, which contains the Credit Cards and Social Security Numbers dictionaries. When a DLP engine uses two or more dictionaries, the DLP service 500 can block content only if all of the dictionaries in the engine are triggered. The DLP engines can scan files with a maximum size of 100 MB. The DLP service 500 can provides four predefined engines:

HIPAA: This engine is designed to detect Health Insurance Portability and Accountability Act (HIPAA) violations, using the Social Security Numbers (US) and Medical Information dictionaries.

GLBA: This engine is designed to detect violations of the Gramm-Leach-Bliley Act (GLBA), using the Social Security Numbers (US) and Financial Statements dictionaries.

PCI: This engine is designed to detect Payment Card Industry (PCI) compliance violations, using the Credit Cards and Social Security Numbers (US) dictionaries.

Offensive Language: This engine is designed to detect offensive language, using the Adult Content dictionary.

The DLP engines can be used to detect data, allow or block transactions, and notify an organization's auditor when a user's transaction triggers a DLP rule. If an organization has a third-party DLP solution, namely the ICAP server 502, the DLP service 500 can forward information about transactions that trigger DLP policy via secure ICAP.

DLP Notifications

In an embodiment, by default, the Subject line for the notification uses the text DLP Violation: with the ${TRANSACTION_ID} and ${ENGINES} macros. These macros will list the ID of the transaction that triggered the DLP rule, as well as the DLP engines that triggered. However, this text can be modified as described herein and can include the ${USER} and ${URL} macros as well.

a) a notification includes a name.

b) a subject line of the notification by default can use the text DLP Violation: with the ${TRANSACTION_ID} and ${ENGINES} macros. These macros will list the ID of the transaction that triggered the DLP rule, as well as the DLP engines that triggered. However, this text can be modified, and one can include the ${USER} and ${URL} macros as well. For a complete list of macros, see step e below.

c) the violating content can be included, such as via an attachment of the violating content added to the notifications emailed to auditors.

d) a TLS connection can be used to send the notification email. Here, the email recipient's SMTP server must support TLS. It is recommended that TLS is used to send an email that might contain sensitive content. Also, the attachments and the violating content are never stored in the cloud-based security system 100 or the DLP service 500. Once sent, all such data is deleted from memory.

e) In the Message as Plain Text or Message as Hypertext Markup Language (HTML) sections, one can create a customized message detailing why the content was blocked. This message is delivered via email (Delivery Status Notification) to the auditor when a policy triggers and blocks content.

The following macros can be used in the message body and subject line:

| ${CLIENT_IP} | This macro is used to specify the user's IP address, if available. |
| --- | --- |
| ${DICTIONARIES} | This macro is used to list the DLP dictionaries associated with the triggered policy, which includes the match count (for dictionaries such as Credit Cards) or score (for machine learning dictionaries such as Financial Statements or Source Code), for each dictionary triggered due to a content match. |

-continued

| | |
|---|---|
| ${DLPMD5} | This macro is used to provide the MD5 hash of the file that triggered the DLP rule. This number can be used as a filter in the Web Logs to find the relevant transactions. |
| ${DLPTRIGGERS} | This macro is used to list the content (up to 10 items) that matched a dictionary. |
| ${ENGINES} | This macro is used to list the DLP engines associated with the triggered policy. |
| ${RULENAME} | This macro is used to specify the name of the triggered DLP rule. |
| ${TIMESTAMP} | This macro is used to specify the time the user attempted to send violating content. |
| ${TRANSACTION_ID} | This macro is used to provide the transaction ID of the transaction that triggered a DLP rule. This unique number can be used as a filter in the Web Logs to find the relevant transactions. |
| ${TYPE} | This macro is used to specify the Cloud App category for the destination traffic. For example, "File Sharing" can be a type. If the destination does not match any Cloud App categories, the type will be "Web Posting." |
| ${URL} | This macro is used to specify the destination URL (i.e., the URL accessed). |
| ${USER} | This macro is used to specify the name of the user, if any. If the user's name is unavailable, "unknown" is used. |

ICAP-DLP Service Communication

Figure 7:
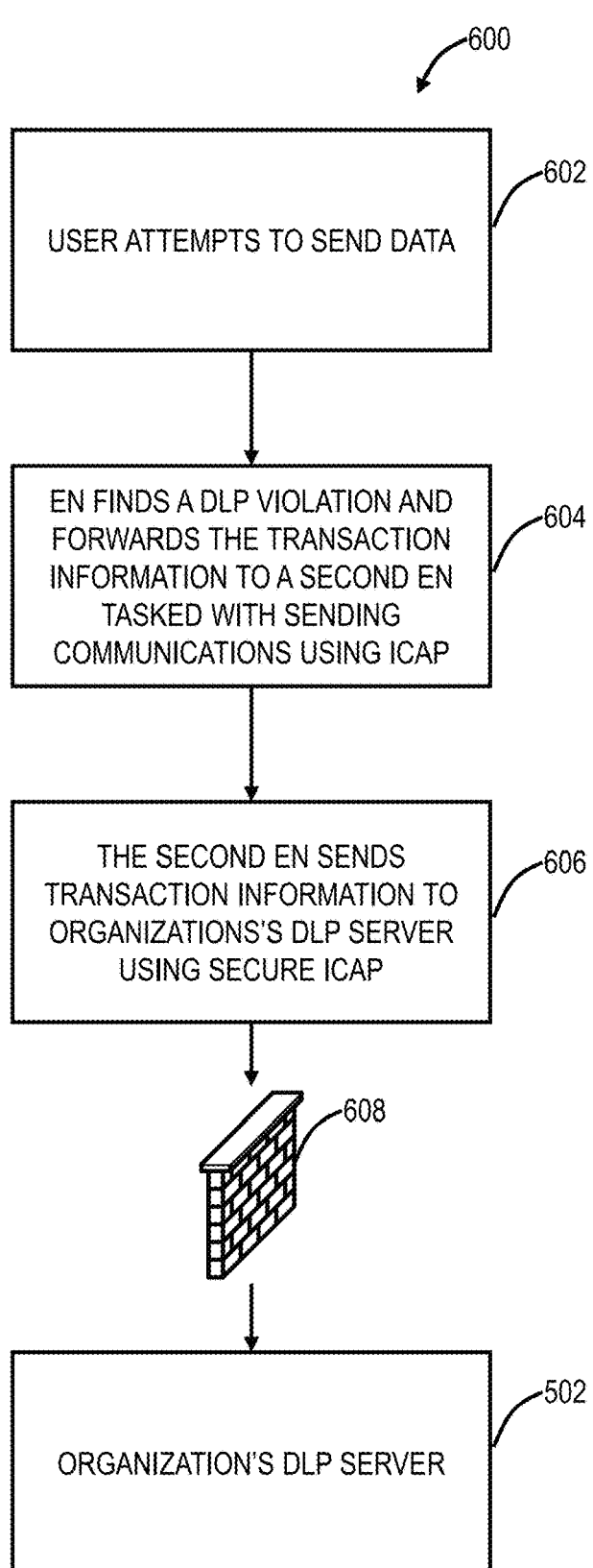
FIG. 7 is a flowchart illustrating a process for communication between the DLP service and the ICAP server.

FIG. 7 is a flowchart illustrating a process 600 for communication between the DLP service 500 and the ICAP server 502. It is a configuration option, via the management system 120, to have the DLP service 500 send information about DLP policy violations to the ICAP server 502. Specifically, the ICAP server 502 is an organization's DLP server and can be one of on-premises (behind an organization's firewall) or cloud-based. Note, the terms ICAP server 502 and DLP server can be utilized interchangeably herein. Once provided by the DLP server 500 to the ICAP server 502, the organization can implement its data loss prevention or remediation workflows.

When the DLP service 500 sends information to the ICAP server 502, it does not do so from a node 150 on the cloud that initially inspects the users' 102 transaction. If a node 150 finds that a transaction violates a DLP policy rule and further, the rule specifies that the DLP service 500 sends violation information to the organization's DLP server, that node 150 will forward the transaction information to a second node 150. The second node 150 is on a different cloud that the DLP service 500 uses for sending communications to the ICAP server 502.

In an embodiment, the second node 150 sends the following information about the transaction to the ICAP server 502:

Client IP and username via ICAP X-headers; and
a copy of the HTTP POST request that contains the file that violated the DLP policy, or if the content is from HTTP Forms data, a copy of the content that violated the DLP policy. The host URL to which the user was attempting to send content would also be included here.

The process 600 includes a user 102 attempting to send data, with the cloud-based security system 100 providing monitoring (step 602). A node 150 finds a DLP violation and forwards the transaction information to a second node 150 tasked with sending communications using ICAP to the ICAP server 502 (step 604). The second node 150 sends the transaction information to the ICAP server 502 using secure ICAP (step 606).

An organization's firewall 608 must be configured to allow communications from the second node 150. Further, to protect the organization's data, the second node 150 can send the above information in an encrypted form via secure ICAP. However, because most DLP servers (ICAP servers 502) can only read unencrypted information, another option is to utilize a tunnel on the ICAP server 502, such as an open-source application called the stunnel application for a TLS/SSL tunnel. After installation, the stunnel application and the second node 150 can establish an SSL communication, and the second node 150 can send transaction information in encrypted form to the ICAP server 502. The stunnel application will then decrypt the transaction information for the ICAP server 502.

Once this process 600 takes place, the ICAP server 502 can read the ICAP communications from the second node 150 and report incidents as applicable in the ICAP server 502.

EDM

Figure 8:
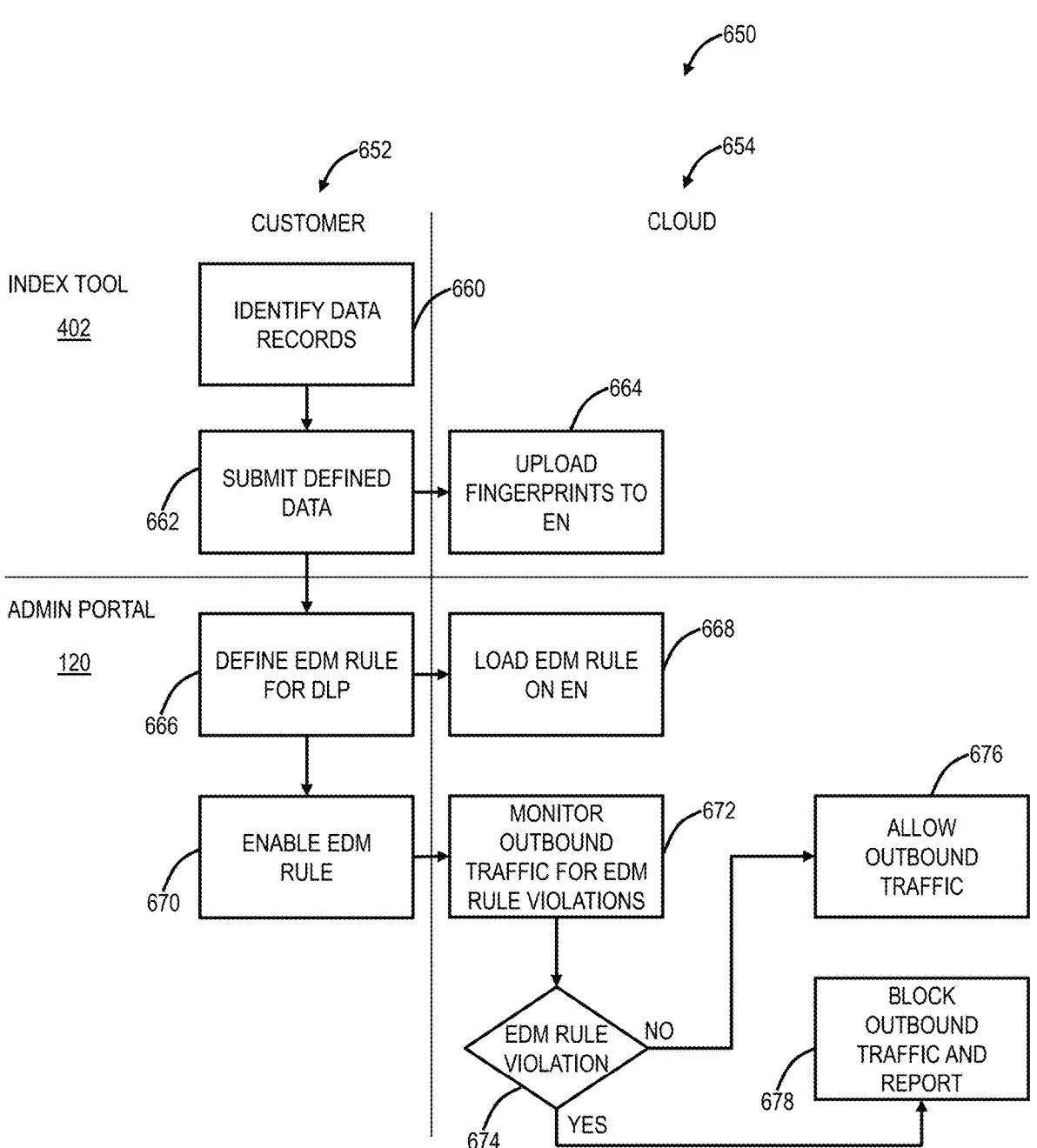
FIG. 8 is a flowchart of a process for Exact Data Match (EDM) with operations described on-premises and in the cloud, and between the index tool on-premises and the management system for the cloud-based system.

FIG. 8 is a flowchart of a process 650 for Exact Data Match (EDM) with operations described on-premises 652 and in the cloud 654, and between the index tool 402 and the management system 120. Again, the EDM index templates allow the DLP service 500 to identify a record from a structured data source that matches predefined criteria. For example, an organization might want to protect Personally Identifiable Information (PII) from being lost or might want to give employees the ability to share their own PII data using a personal email or file-sharing account. In either case, identifying and correlating multiple tokens that contribute to a particular record, to identify ownership of that data, is crucial.

In the index tool 402, data records are identifier (step 660), and defined data is submitted (step 662), and fingerprints are uploaded to the nodes 150 (step 664). Again, importantly, the data itself is not uploaded, but hash signatures. In the admin portal (management system 120), an IT administrator can define an EDM rule for the DLP service (step 666), load the EDM rule on the nodes 150 (step 668), enable the EDM rule (step 670), etc. The nodes 150 can monitor outbound traffic for EDM rule violations (step 672), and responsive to an EDM rule violation check (step 674), either allow the outbound traffic (step 676) or block the outbound traffic and report (step 678)/

Creating an EDM template allows one to define these tokens (i.e., criteria) for data records by importing a CSV file. Once the data is defined and submitted, it is possible to apply the template to a custom DLP dictionary or engine, which will use the criteria to match against the data records. The DLP service 500 will then evaluate the EDM-defined DLP rule with the appropriate action for any outbound traffic. When creating an EDM index template, tokens (i.e., criteria) are defined for the data records, and at least one primary field is specified. The primary field is a unique key that the DLP policy rules are based on. It is a required field that must be unique based on the data records.

The following illustrates some consideration before creating an EDM index template. Review the DLP policy that is to be created and the data to be protected. During the review, consider the data that must be included in the EDM index template. Try to create a template where the data records need to be indexed once, to avoid the need to re-index. Finally, review the data records to avoid duplication.

Let's use the following example: Assume the organization is a bank with an employee database, and the objective is to protect the employees' PII as well as their company credit card information. The database records contain the following data fields: First Name (FName), Last Name (LName), Social Security Number (SSN), Credit Card Number (CCN), Mobile Phone Number, Postal Code, Street Address, and so on. The DLP dictionaries or engines that need to be created with EDM, which can then be used in the DLP policies, must cover a series of field combinations to protect the employees' information adequately. So, based on your records in this example, any of the following data field combinations could be used to create a DLP dictionary:

---

SSN, FName, LName
CCN, FName, LName
SSN, CCN, LName
SSN, CCN, FName, LName

---

However, the EDM index template created using the index tool 402 must allow the dictionary to cover the field combinations required. This can be accomplished by selecting a primary field based on the data field combination needed. Using the example of the bank, specifying a primary field allows the creation of a single EDM index template to protect the employees' information, where:

all of the data field combinations required for an employee PII DLP dictionary and associated policies are covered.

all of the data field combinations required for a credit card DLP dictionary and associated policies are covered, whenever a company credit card is issued to an employee.

the employee data records only need to be indexed once.

So, using the index tool 402, an EDM index template would be created that includes the following fields: SSN, CCN, FName, and LName. To create the employee PII DLP dictionary, SSN can be selected as a primary field. However, to create the company-issued employee credit card DLP dictionary using the same template, select CCN as a 2nd primary field. The other included fields (i.e., FName, LName) will be applied as Secondary Fields for both dictionaries. Finally, in this example, BankNum is not a required data field for the DLP policies.

DLP Incident Forwarding

Figure 9:
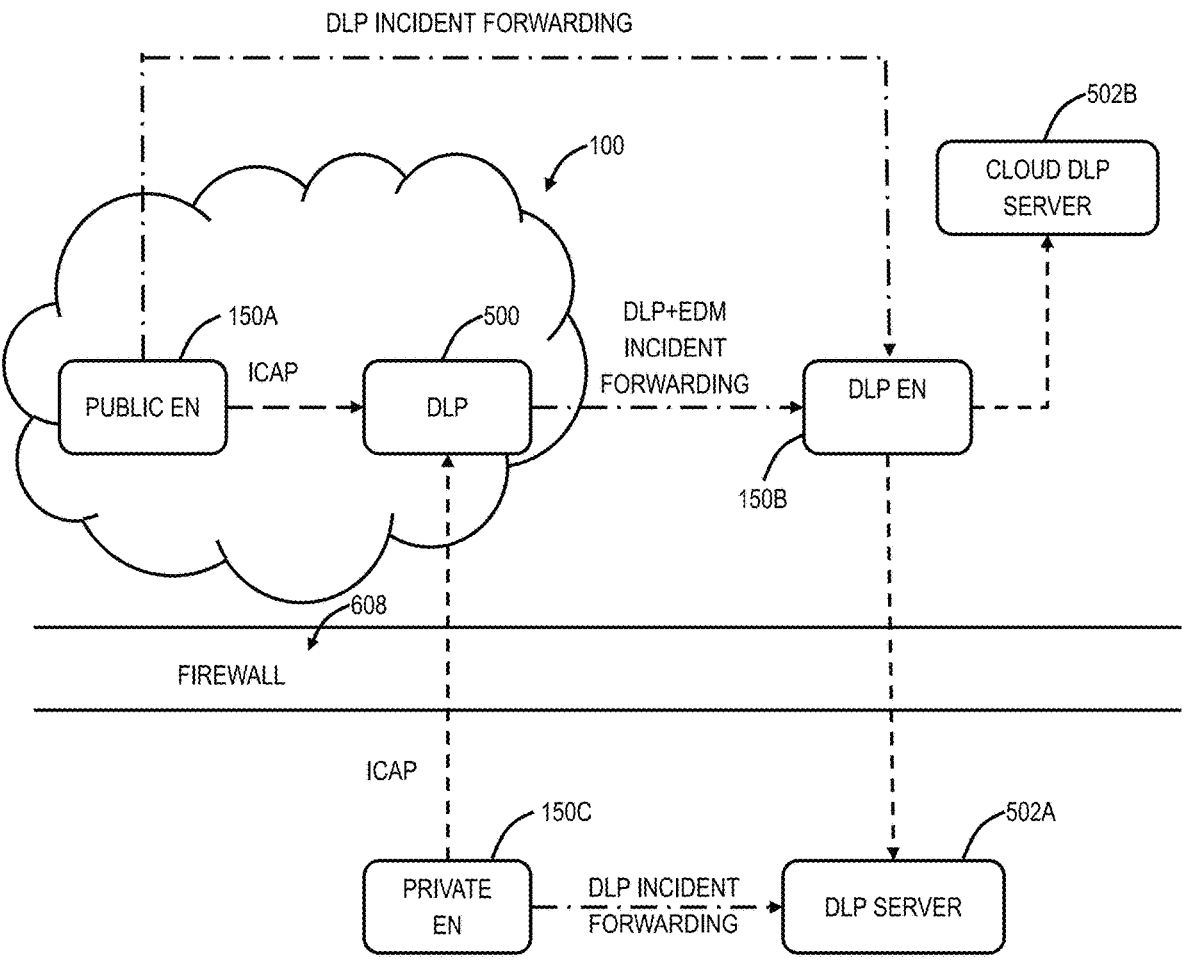
FIG. 9 is a network diagram of a DLP incident forwarding system with the DLP service operating in the cloud-based security system to provide DLP incident information to an organization's DLP server.

FIG. 9 is a network diagram of a DLP incident forwarding system 700 with the DLP service 500 operating in the cloud-based security system 100 to provide DLP incident information to an organization's DLP server 502. As described above, when a DLP rule is triggered, incident information is forwarded via passive ICAP and/or email notification. Via Passive ICAP, the DLP service 500 can forward the original upload to the customer's designated ICAP server 502. To provide additional information and context, the present disclosure ensures this ICAP message contains information regarding the DLP scan results (dictionary, engine, search score, triggers, etc.) or transaction details (time, user, URL, cloud app, etc.). The ICAP message also contains the full uploaded data in case of a multipart request. The email notification can also have all these details.

The feature discussed in this document describes a technique to forward the content that triggered the DLP rule along with the DLP scan information to a designated ICAP server 502. The ICAP server 502 can be either customer specified, on-premises ICAP server 502A, or a cloud-based ICAP server 502B that works with the cloud-based security system 100. In FIG. 9, the public node 150A is configured to implement monitoring of the users 102 for the DLP service 500. The public node 150A is referred to as public due to the fact it is part of the cloud-based security system 100 and operates in a multi-tenant manner.

On detection of a DLP rule violation, the public node 150A triggers the DLP service 500 via an ICAP message. The public node 150A can send a DLP incident forwarding message to the DLP node 150B. The DLP node 150B is the second node 150 described above, and it is tasked with forwarding the DLP incidents to the DLP servers 502A, 502B. The DLP service 500 can provide DLP and EDM incident forwarding information to the DLP node 150B. Note, in some embodiments, an organization may include a private node 150C located behind the firewall 608 on the same network as the DLP server 502A. Here, the private node 150C can perform similar functionality as the public node 150A, but it can directly communicate to the DLP server 502A, being on the same, secure network.

Cloud ICAP Server

Figures 10, 11:
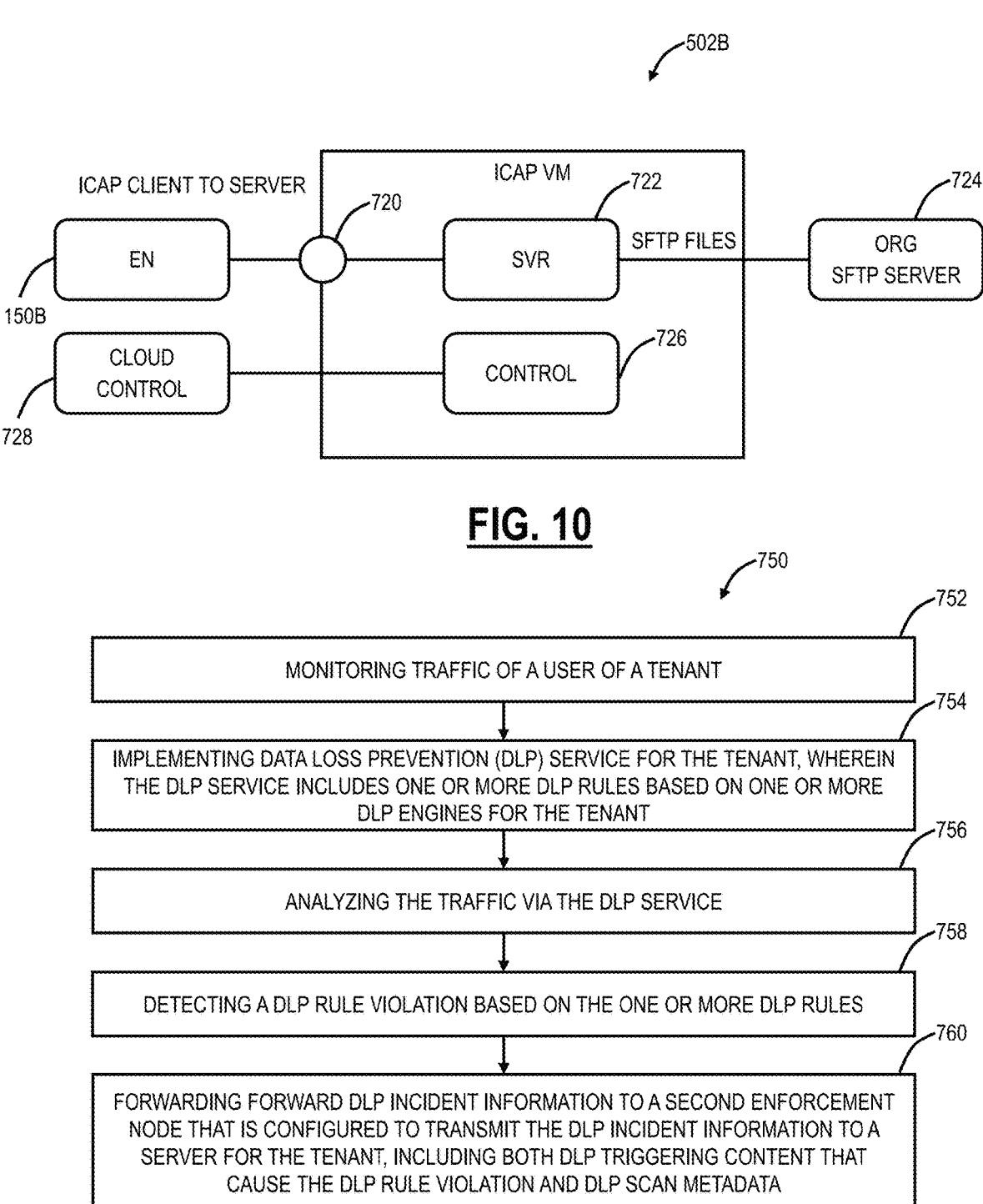
FIG. 10 is a block diagram of a cloud DLP server.
FIG. 11 is a flowchart of a DLP incident forwarding process.

FIG. 10 is a block diagram of a cloud DLP server 502B. In an embodiment, the cloud DLP server 502B can be a Virtual Machine (VM), executed on the server 200, as well as part or separate from the cloud-based security system 100. The cloud DLP server 502B includes a public IP address 720 that is configured to receive the ICAP messages from the DLP node 150B. The cloud DLP server 502B includes an incident response server 722 that is configured to receive the ICAP messages and convert them to a Secure File Transfer Protocol (SFTP) format and provide to an organization's SFTP server 724. The cloud DLP server 502B can also include control 726 that operates with a cloud control 728.

The incident response server 722 is configured to set up client certificates with the cloud-based security system 100 and setup server certificates with the DLP node 150B. The incident response server 722 is further configured to set up Secure Shell (SSH) public key authentication with the organization's SFTP server 724. The control 724, 728 is used for download and install build, requires client certificate to be installed for authentication with the cloud-based security system 100. The incident response server 722 can include a process that listens on a public IP:1344 and accepts SSL connection only.

The client certificate is used for authentication from the incident response server 722 to the cloud-based security system 100. The server certificate is used for the incident response server's 722 ICAP server process. The node's 150B ICAP client needs to do verification against the incident response server 722.

DLP Incident Forwarding Process

FIG. 11 is a flowchart of a DLP incident forwarding process 750. The DLP incident forwarding process 750 contemplated operation as a computer-implemented method, embodied in a non-transitory computer-readable storage medium having computer-readable code stored thereon for programming one or more processors at a first node in a cloud-based security system, and via the cloud-based security system.

The process 750 includes monitoring traffic of a user of a tenant (step 752); implementing Data Loss Prevention (DLP) service for the tenant, wherein the DLP service includes one or more DLP rules based on one or more DLP engines for the tenant (step 754); analyzing the traffic via the DLP service (step 756); detecting a DLP rule violation based on the one or more DLP rules (step 758); and forwarding forward DLP incident information to a second node that is configured to transmit the DLP incident information to a server for the tenant, including both DLP triggering content that caused the DLP rule violation and DLP scan metadata (step 760).

The first node and the second node can be configured to forward the DLP incident information and not persist the DLP triggering content in memory. The DLP triggering content can include all or a portion of data that triggered the DLP rule violation so that the tenant can determine remediation, and the DLP scan metadata can include a plurality of a DLP dictionary, a DLP engine, a search score, a trigger, a time, a user, and a Uniform Resource Locator (URL).

The DLP rule violation can be a violation of an Exact Data Match (EDM) index provided to the cloud-based security system as a hash signature so that underlying data is not accessible by the cloud-based security system, and wherein the triggering content includes the hash signature which is converted back to the underlying data at the server for the tenant.

The server can include an Internet Content Adaptation Protocol (ICAP) server that is one of located on-premises with the tenant and located in a cloud system and connected securely to another server located on-premises with the tenant. The first node can be configured to monitor the traffic that includes any of Secure Sockets Layer (SSL) traffic and Transport Layer Security (TLS) traffic as a proxy.

Removing Sensitive Data from a Cloud-Based System

The present systems and methods, in combination with the various DLP processes described herein are adapted to efficiently facilitate the removal of sensitive customer data from various storage channels in the cloud-based system 100. These storage channels can include cloud storage systems, device storage, storage ques such as distributed event stores and stream-processing platforms, and the like. Various embodiments described herein are adapted to utilize schema registries and provide customizable ways to identify and remove sensitive information from the cloud.

The various embodiments described herein reference Kafka as an example of a distributed event store and stream-processing platform, which is a well-known data storage que which persists data. Various embodiments utilize the Kafka schema registry to identify and remove sensitive information from Kafka topics. A Kafka topic is a core concept in Apache Kafka, which is a distributed streaming platform used for building real-time data pipelines and event-driven applications. Thus, in Kafka, data is organized and categorized into topics which play a crucial role in building event-driven architectures and real-time data processing pipelines.

There are 2 types of data persistence within Kafka, one being transient, and the second being permanent. With transient data persistence, the data is only persisted for a configured amount of time before it is removed by the system. Alternatively, data can be stored permanently within Kafka. Permanently stored data can be detrimental to customers, more particularly, sensitive data that is permanently stored can cause various security risks to data and users. For example, sensitive customer data can include host name, customer name, email addresses, and the like. Because of potential security risks involved with persisting such customer data, it is beneficial to understand what information is sensitive and purge the sensitive data from data storage such as Kafka and the like.

Kafka itself does not enforce a specific schema for topics. Instead, Kafka is designed to be schema-agnostic, meaning it allows users to publish and consume data in a variety of formats without imposing a particular data structure or schema. However, when working with Kafka, especially in a real-world, production environment, it's common to have a well-defined schema (data storage schema) for the data being published to topics. This schema defines the structure and data types of the messages or records within the topic, and it helps ensure consistency and interoperability between producers and consumers. Apache Kafka often integrates with a schema registry, such as confluent schema registry. This registry stores schemas for different topics and versions of those schemas. Producers and consumers can then use the registry to ensure that the data they send or receive adheres to a specific schema. Thus, a Kafka schema registry stores and manages schema definitions for data stored in Kafka topics. It can be used to identify sensitive information in changelog style topics by analyzing the schema, which defines the structure of the data being stored. The schema gives an idea of whether or not the data therein is sensitive based on various fields further described herein. However, the definition of sensitive information may vary depending on the application and user, which makes it difficult to identify all possible sensitive fields.

To address this challenge, the present systems and methods enable users to provide a customizable dictionary of sensitive information fields that are relevant to their specific use case. This dictionary can contain the field names/variables that correspond to sensitive information such as names, social security numbers, and other personal identifiers. By using this dictionary, and analyzing the topic schemas, the systems can accurately identify where sensitive information is being persisted and remove sensitive information from Kafka topics by emitting tombstones for the relevant messages. In Apache Kafka, a "tombstone" is a special type of record used for deletion purposes in a topic. Tombstone records are also known as "delete records" or "tombstone markers."

Variables, in the context of Kafka schemas, are the fields or elements within the schema that can vary in their content or value. In other words, variables in a Kafka schema refer to the data fields or attributes within a message or record. By assuming that the name for a variable within a schema gives some kind of indication as to how sensitive the information is, the present systems can facilitate the removal of sensitive data based on a comparison between the schemas and the dictionaries.

By utilizing the present systems and methods in combination with the DLP processes described herein, the present systems can be adapted to identify, in real-time production environments, sensitive data and thus determine whether or not to persist such data in Kafka or other services of the like.

That is, the present systems are adapted to monitor traffic within the cloud-based system 100, and based on the location that data is meant to be persisted, i.e., based on the schema, the systems can cause sensitive data to not be persisted. Similar to utilizing the DLP dictionaries (dictionaries) described herein which include a set of data to detect specific kinds of information in the user traffic, these dictionaries can be utilized to determine whether or not to persist data in a distributed event store and stream-processing platform such as Kafka, to purge sensitive data from such platforms, etc. That is, the various embodiments can function like the DLP systems described herein, but instead of allowing and blocking content, the system persists or does not persist data in Kafka based on a dictionary and a schema.

Predefined dictionaries can include specific sensitive data types such as bank routing numbers, adult content, credit cards, financial statement, medical information, names, SSN, source code, specific customer data, Personally Identifiable Information (PII), etc. In addition to the predefined dictionaries, tenants/customers can provide custom dictionaries, such as via the EDM system 400. A custom dictionary can include alphanumeric patterns that match a wide variety of data types. For example, one can define patterns to detect data like phone numbers, driver's license numbers, or credit card numbers for specific issuers. In addition to the predefined dictionaries and custom dictionaries, the present systems and methods are adapted to utilize model generated dictionaries. These model generated dictionaries can be constructed by one or more machine learning models that are trained with large amounts of historic sensitive data in order to allow the one or more machine learning models to generate sensitive data dictionaries. The present systems can use standard (cloud wide) and/or custom (customer specific) dictionaries to continuously monitor the cloud environment for performing the processes described herein. In other embodiments, the systems can use the dictionaries to purge sensitive data due to a customer of the cloud-based system being offboarded.

In an exemplary use case, the present systems and methods are utilized to identify sensitive/PII data present in Kafka topics using the schema registry and emit tombstones. For example, by looking at a schema and identifying that a topic has a field called "hostname" (an example of a sensitive data type/field) and this field name/variable is listed in the dictionary, the systems know that the topic is sensitive. The systems can then remove or obfuscate the data within the topic to protect it. The process for purging sensitive data of a customer responsive to the customer being offboarded can include receiving or generating a dictionary of sensitive schema types and variable types, utilizing the dictionary to identify any matches in persisted data, and responsive to finding matches in persisted data, identifying the matched data as being sensitive. The systems are then adapted to automatically remove the data. Permanent data stored in services such as Kafka can introduce risk for customers that are being offboarded, thus the present systems can be utilized to streamline the process of purging sensitive data responsive to a customer of the cloud-based system being offboarded.

Utilizing the present systems and methods for removing sensitive data from Kafka can include the following steps. Once a customer is identified as requiring offboarding, the systems can initiate the various DLP processes described herein. In this example, for removing sensitive data from Kafka, the systems utilize one or more dictionaries which include a plurality of sensitive data types, variables, field names, etc. The systems can then compare variables within the Kafka schemas to the variables in the dictionary and, based on finding one or more matching variables/data types, identify those matching topics as including sensitive data. The systems are then adapted to, based on finding matches, perform an action such as obfuscating the sensitive data, purging the sensitive data, and persisting non-sensitive data.

Again, as described herein, the various embodiments for removing sensitive data can be performed in combination with the various DLP processes. That is, the various DLP dictionaries can be utilized to determine if any sensitive data is being persisted in Kafka or other services of the like. For example, the various systems described herein can utilize dictionaries which include sets of data that are designed to detect sensitive information in Kafka. Processes can include monitoring persisted data in Kafka or other storage locations in the cloud-based system and analyzing this persisted data via the DLP techniques in combination with the dictionaries to detect sensitive data being persisted. Based on finding sensitive data being persisted, the systems can perform any of the actions disclosed herein including but not limited to reporting, removing the sensitive data, obfuscation, etc.

Process for Removing Sensitive Data from a Cloud-Based System

FIG. 12 is a flow chart of a process for removing sensitive data from a cloud-based system. The process 1200 includes receiving one or more dictionaries, the one or more dictionaries including a plurality of field names identified as corresponding to sensitive information (step 1202); analyzing one or more data storage schemas, the one or more data storage schemas defining how data is stored in a cloud-based system (step 1204); comparing a plurality of variables within the one or more data storage schemas to the field names in the one or more dictionaries for identifying matches therein (step 1206); and responsive to identifying a match between a variable of the plurality of variables and one or more of the field names, performing an action based thereon (step 1208).

The process 1200 can further include wherein the one or more dictionaries include customer specific field names, and wherein the action is performed on a per-customer basis. The action can include any of obfuscating data associated with the variable and removing data associated with the variable. The data can be persisted in Apache Kafka, and removing data associated with the variable can include creating a tombstone record. The steps can be performed responsive to a requirement to offboard a customer of the cloud-based system, in which case the steps include analyzing one or more Apache Kafka schemas, the one or more Apache Kafka schemas defining how data is stored and persisted in Apache Kafka; comparing a plurality of variables within the one or more Apache Kafka schemas to field names in a dictionary, wherein the field names correspond to sensitive information; and responsive to identifying a match between a variable of the plurality of variables and one or more of the field names, removing data associated with the variable from persisting in Apache Kafka. The steps can include receiving a dictionary associated with the customer being offboarded. The plurality of variables within the one or more Apache Kafka schemas define data fields, wherein removing data associated with the variable can include removing the data from associated data fields. The one or more dictionaries can include any of a predefined dictionary and a custom dictionary. The one or more dictionaries can include a model generated dictionary, the model generated dictionary being generated by one or more machine learning models trained with sensitive data. The steps can include monitoring traffic within the cloud-based system, wherein the action can include, based on the one or more storage schemas and the one or more dictionaries, causing data to not be persisted.

Conclusion

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a Read-Only Memory (ROM), a Programmable Read-Only Memory (PROM), an Erasable Programmable Read-Only Memory (EPROM), an Electrically Erasable Programmable Read-Only Memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method for identifying and removing sensitive data from a cloud-based system, the method comprising steps of:

receiving one or more dictionaries, the one or more dictionaries including a plurality of field names identified as corresponding to sensitive information;

analyzing one or more data storage schemas, the one or more data storage schemas defining how data is stored in a cloud-based system;

comparing a plurality of variables within the one or more data storage schemas to the field names in the one or more dictionaries for identifying matches therein; and responsive to identifying a match between a variable of the plurality of variables and one or more of the field names, performing an action based thereon, wherein the steps are performed responsive to a requirement to offboard a customer of the cloud-based system, and wherein the steps further comprise:

analyzing one or more Apache Kafka schemas, the one or more Apache Kafka schemas defining haw data is stored and persisted in Apache Kafka;

comparing a plurality of variables within the one or more Apache Kafka schemas to field names in a dictionary, wherein the field names correspond to sensitive information; and responsive to identifying a match between a variable of the plurality of variables and one or more of the field names, removing data associated with the variable from persisting in Apache Kafka.

2. The method of claim 1, wherein the one or more dictionaries include customer specific field names, and wherein the action is performed on a per-customer basis.

3. The method of claim 2, wherein the action includes any of obfuscating data associated with the variable and removing data associated with the variable.

4. The method of claim 3, wherein the data is persisted in Apache Kafka, and removing data associated with the variable includes creating a tombstone record.

5. The method of claim 1, wherein the steps comprise receiving a dictionary associated with the customer being offboarded.

6. The method of claim 1, wherein the plurality of variables within the one or more Apache Kafka schemas define data fields, and wherein removing data associated with the variable comprises removing the data from associated data fields.

7. The method of claim 1, wherein the one or more dictionaries include any of a predefined dictionary and a custom dictionary.

8. The method of claim 1, wherein the one or more dictionaries include a model generated dictionary, the model generated dictionary being generated by one or more machine learning models trained with sensitive data.

9. The method of claim 1, wherein the steps comprise monitoring traffic within the cloud-based system, and wherein the action includes, based on the one or more storage schemas and the one or more dictionaries, causing data to not be persisted.

10. A non-transitory computer-readable storage medium having computer-readable code stored thereon for programming one or more processors to perform steps of:

receiving one or more dictionaries, the one or more dictionaries including a plurality of field names identified as corresponding to sensitive information;

analyzing one or more data storage schemas, the one or more data storage schemas defining how data is stored in a cloud-based system;

comparing a plurality of variables within the one or more data storage schemas to the field names in the one or more dictionaries for identifying matches therein; and responsive to identifying a match between a variable of the plurality of variables and one or more of the field names, performing an action based thereon, wherein the steps are performed responsive to a requirement to offboard a customer of the cloud-based system, and wherein the steps further comprise:

analyzing one or more Apache Kafka schemas, the one or more Apache Kafka schemas defining haw data is stored and persisted in Apache Kafka;

comparing a plurality of variables within the one or more Apache Kafka schemas to field names in a dictionary, wherein the field names correspond to sensitive information; and responsive to identifying a match between a variable of the plurality of variables and one or more of the field names, removing data associated with the variable from persisting in Apache Kafka.

11. The non-transitory computer-readable storage medium of claim 10, wherein the one or more dictionaries include customer specific field names, and wherein the action is performed on a per-customer basis.

12. The non-transitory computer-readable storage medium of claim 11, wherein the action includes any of obfuscating data associated with the variable and removing data associated with the variable.

13. The non-transitory computer-readable storage medium of claim 12, wherein the data is persisted in Apache Kafka, and removing data associated with the variable includes creating a tombstone record.

14. The non-transitory computer-readable storage medium of claim 10, wherein the steps comprise receiving a dictionary associated with the customer being offboarded.

15. The non-transitory computer-readable storage medium of claim 10, wherein the plurality of variables within the one or more Apache Kafka schemas define data fields, and wherein removing data associated with the variable comprises removing the data from associated data fields.

16. The non-transitory computer-readable storage medium of claim 10, wherein the one or more dictionaries include any of a predefined dictionary and a custom dictionary.

17. The non-transitory computer-readable storage medium of claim 10, wherein the one or more dictionaries include a model generated dictionary, the model generated dictionary being generated by one or more machine learning models trained with sensitive data.

18. The non-transitory computer-readable storage medium of claim 10, wherein the steps comprise monitoring traffic within the cloud-based system, and wherein the action includes, based on the one or more storage schemas and the one or more dictionaries, causing data to not be persisted.

* * * * *